US009550435B2

(12) United States Patent
Ozaki et al.

(10) Patent No.: US 9,550,435 B2
(45) Date of Patent: Jan. 24, 2017

(54) ELECTRIC VEHICLE CONTROL DEVICE

(71) Applicant: NTN CORPORATION, Osaka (JP)

(72) Inventors: Takayoshi Ozaki, Iwata (JP); Koichi Okada, Iwata (JP); Kenichi Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 96 days.

(21) Appl. No.: 14/359,726

(22) PCT Filed: Nov. 22, 2012

(86) PCT No.: PCT/JP2012/080323
§ 371 (c)(1),
(2) Date: May 21, 2014

(87) PCT Pub. No.: WO2013/077409
PCT Pub. Date: May 30, 2013

(65) Prior Publication Data
US 2014/0330470 A1     Nov. 6, 2014

(30) Foreign Application Priority Data

Nov. 24, 2011  (JP) ................................ 2011-256141
Dec. 1, 2011   (JP) ................................ 2011-263401

(51) Int. Cl.
*B60L 15/20*     (2006.01)
*B60L 3/10*      (2006.01)
(Continued)

(52) U.S. Cl.
CPC ............ *B60L 15/2072* (2013.01); *B60L 1/003* (2013.01); *B60L 3/102* (2013.01); *B60L 3/108* (2013.01);
(Continued)

(58) Field of Classification Search
None
See application file for complete search history.

(56) References Cited

U.S. PATENT DOCUMENTS 6,909,950 B2   6/2005   Shimizu
7,072,751 B2   7/2006   Shimizu
(Continued)

FOREIGN PATENT DOCUMENTS

CN   101516663   8/2009
JP   8-182119    7/1996
(Continued)

OTHER PUBLICATIONS

PCT International Preliminary Report on Patentability mailed Jun. 5, 2014 in corresponding International Patent Application No. PCT/JP2012/080323.
(Continued)

*Primary Examiner* — Mussa A Shaawat
*Assistant Examiner* — Kyung Kim

(57) ABSTRACT

An angular acceleration monitor may monitor whether or not an angular acceleration of a wheel detected by an angular acceleration detector is equal to or smaller than an acceptable angular acceleration (W) that is calculated with the following formula: $W = k_1 \times R \times Tt/m/r^2$ where $k_1$ is a constant, $Tt$ is a total drive torque that is a sum of drive torques of all motor units that drive wheels of the vehicle, m is vehicle mass, r is tire radius, and R is reduction ratio of a reducer unit interposed between the motor unit and the wheel. A slip-responsive controller causes, if it is determined that the acceptable angular acceleration is exceeded, a motor controller to reduce a drive torque of the motor unit(s).

10 Claims, 12 Drawing Sheets

(51) Int. Cl.
*B60L 1/00* (2006.01)
*B60L 7/14* (2006.01)
*B60L 7/26* (2006.01)
*B60L 11/18* (2006.01)

(52) U.S. Cl.
CPC .. *B60L 7/14* (2013.01); *B60L 7/26* (2013.01); *B60L 11/1803* (2013.01); *B60L 15/2009* (2013.01); *B60L 15/2036* (2013.01); *B60L 2220/44* (2013.01); *B60L 2220/46* (2013.01); *B60L 2220/50* (2013.01); *B60L 2240/12* (2013.01); *B60L 2240/20* (2013.01); *B60L 2240/24* (2013.01); *B60L 2240/26* (2013.01); *B60L 2240/34* (2013.01); *B60L 2240/421* (2013.01); *B60L 2240/423* (2013.01); *B60L 2240/429* (2013.01); *B60L 2240/465* (2013.01); *B60L 2240/622* (2013.01); *B60L 2240/642* (2013.01); *B60L 2250/16* (2013.01); *B60L 2250/26* (2013.01); *B60L 2260/28* (2013.01); *B60L 2270/145* (2013.01); *Y02T 10/641* (2013.01); *Y02T 10/645* (2013.01); *Y02T 10/7005* (2013.01); *Y02T 10/7275* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 7,455,143 | B2 | 11/2008 | Imura et al. |
| 7,650,216 | B2 | 1/2010 | Itoh et al. |
| 8,078,348 | B2 | 12/2011 | Saitoh et al. |
| 8,307,931 | B2 | 11/2012 | Akamatsu |
| 2003/0171869 | A1 | 9/2003 | Potter et al. |
| 2003/0221881 | A1* | 12/2003 | Lee .................. B60K 6/48 180/65.25 |
| 2004/0027076 | A1 | 2/2004 | Shimizu |
| 2005/0206332 | A1 | 9/2005 | Shimizu |
| 2005/0258785 | A1* | 11/2005 | Hommi .................. B60K 6/445 318/52 |
| 2006/0219454 | A1 | 10/2006 | Itoh et al. |
| 2006/0237244 | A1* | 10/2006 | Hommi .................. B60K 6/365 180/65.235 |
| 2007/0095585 | A1 | 5/2007 | Imura et al. |
| 2009/0112386 | A1 | 4/2009 | Saitoh et al. |
| 2009/0210128 | A1 | 8/2009 | Fujimoto et al. |
| 2009/0236157 | A1 | 9/2009 | Akamatsu |

FOREIGN PATENT DOCUMENTS

| | | |
|---|---|---|
| JP | 2002-186120 | 6/2002 |
| JP | 2006-141104 | 6/2006 |
| JP | 2006-283591 | 10/2006 |
| JP | 2007-116860 | 5/2007 |
| JP | 2007-252045 | 9/2007 |
| JP | 2007-282357 | 10/2007 |
| JP | 2008-172935 | 7/2008 |
| JP | 2009-106130 | 5/2009 |
| JP | 2011-61945 | 3/2011 |

OTHER PUBLICATIONS

Japanese Office Action dated Jun. 30, 2015 in corresponding Japanese Patent Application No. 2011-256141.
International Search Report mailed Feb. 19, 2013 in corresponding International Patent Application No. PCT/JP2012/080323.
Japanese Office Action dated Aug. 4, 2015 in corresponding Japanese Patent Application No. 2011-263401.
Chinese Office Action dated Aug. 3, 2015 in corresponding Chinese Patent Application No. 201280057647.7.
Extended and Supplementary European Search Report dated Apr. 7, 2016 in corresponding European Patent Application No. 12851692.9.

* cited by examiner $F=(Tt\times R)/r$

US 9,550,435 B2

ELECTRIC VEHICLE CONTROL DEVICE

CROSS-REFERENCE TO THE RELATED APPLICATIONS

This application is a U.S. national stage application of PCT/JP2012/080323 filed Nov. 22, 2012 and claims foreign priority benefit of Japanese Patent Applications No. 2011-256141, filed Nov. 24, 2011, and No. 2011-263401, filed Dec. 1, 2011, in the Japanese Intellectual Property Office, the contents of which are incorporated herein by reference.

BACKGROUND OF THE INVENTION

Field of the Invention

The present invention relates to an electric vehicle control device for an electric vehicle that may be battery-powered or fuel cell-powered. The present invention in particular relates to slip control of tire(s) of such an electric vehicle.

Description of Related Art

An electric vehicle such as an electric automotive car often employs a motor that may be superior to an internal combustion engine in terms of response characteristics. In an in-wheel motor electric vehicle, each wheel may be equipped with such a highly responsive motor that operates independently of other motor(s).

[Patent Document 1] JP Laid-open Patent Publication No. 2008-172935

SUMMARY OF THE INVENTION

As noted above, an electric vehicle may include highly responsive motor(s). With the implementation of torque control, such highly responsive motor(s) may undesirably cause sudden increase of rotation of tire(s) when the tire(s) lose(s) contact with a road surface due to, for example, slip of the tire(s). Sudden increase of rotation of a motor that may occur in response to slip may jeopardize the stable travel of a vehicle. In an in-wheel motor electric vehicle, wheels may be driven independently of each other. In such a case, it may be all the more important to minimize sudden increase of rotation of motor(s) equipped to drive wheel(s), which be caused by slip.

As just discussed, an electric vehicle may be driven with motor(s) having good response characteristics. This may facilitate, together with the implementation of torque control, the stable travel of the vehicle. In particular, when it comes to slip control, the resulting quick torque response may enable the implementation of advanced control which can be superior to brake-based slip control. A common type of slip control may be designed to determine that there is slip and to reduce a torque, if an angular acceleration of a tire is greater than a certain value. With this measure, however, it may not be possible to accommodate the fact that an angular acceleration fluctuates with the change of a drive torque and the fact that this is also true when slip occurs. This may encourage the adoption of threshold design on the safer side that allows for a wider acceptable margin. In such a case, however, grip of tire(s) may not be maximized.

An object of the present invention is to provide an electric vehicle control device which may prevent possible increase of abnormal torque caused by slip of tire(s), thereby contributing to the stable travel of the vehicle. Another object of the present invention is to provide an electric vehicle control device and an electric vehicle which may enable appropriate slip prevention, thereby maximizing grip of tire(s). Yet another object of the present invention is to provide an electric vehicle which may prevent possible increase of abnormal torque caused by slip of tire(s), thereby leading to the stable travel of the vehicle. General aspects of the present invention will now be described using reference signs in the figures showing embodiments of the present invention.

The present invention may provide an electric vehicle control device 20 that includes a motor controller 33 configured to control, according to a torque command fed from a torque command generator 34, a motor torque of a motor unit 6 that is configured to drive a wheel 2, an angular acceleration detector 39 configured to detect an angular acceleration of the wheel 2 driven by the motor unit 6. The control device 20 also includes an angular acceleration monitor 37 configured to monitor whether or not an angular acceleration of the wheel 2 detected by the angular acceleration detector 39 is equal to or smaller than an acceptable angular acceleration W that is calculated with one of following formulas (1) to (6):

(1) $W = k1 \times R \times Tt/m/r^2$ where k1 is a constant that takes an arbitrary value in the range of 1 to 2;

(2) $W = k2 \times R \times Tt/m/r^2 + mg \times \sin(a)/m/r$ where k2 is a constant that takes an arbitrary value in the range of 1 to 2 and g is a gravitational acceleration;

(3) $W = k3 \times R \times Tt/m/r^2 + mg \times \sin(a1)/m/r$ where k3 is a constant that takes an arbitrary value in the range of 1 to 2;

(4) $W = k4 \times R \times Tmaxt/m/r^2$ where Tmaxt is a total maximum torque that is a sum of maximum torques of all motor units that drive wheels of a vehicle and k4 is a constant that takes an arbitrary value in the range of 1 to 2;

(5) $W = k5 \times R \times Tmaxt/m/r^2 + mg \times \sin(a)/m/r$ where Tmaxt is a total maximum torque that is a sum of maximum torques of all motor units that drive wheels of the vehicle, k5 is a constant that takes an arbitrary value in the range of 1 to 2, and g is a gravitational acceleration; and (6) $W = k6 \times R \times Tmaxt/m/r^2 + mg \times \sin(a1)/m/r$ where Tmaxt is a total maximum torque that is a sum of maximum torques of all motor units that drive wheels of the vehicle and k6 is a constant that takes an arbitrary value in the range of 1 to 2;

where Tt is a total drive torque that is a sum of drive torques of all motor units 6 that drive wheels 2, m is a vehicle mass, r is a tire radius, R is a reduction ratio of a reducer unit 7 interposed between the motor unit 6 and the wheel 2, a is a vehicle climbing angle detected by a climbing angle detector 41, and a1 is a maximum vehicle climbing angle as specified by specifications of the vehicle.

The control device 20 also includes a slip-responsive controller 38 configured to, when the angular acceleration monitor 37 determines that the detected angular acceleration is greater than the acceptable angular acceleration W, cause the motor controller 33 to reduce a drive torque of the motor unit 6.

The units used to express the aforementioned quantities are, respectively, Tt (Nm), m (kg), r (m) and W (rad/s$^2$) (the same applies below).

Use of the formula (1) will be considered. A theoretical angular acceleration w of a wheel 2 that does not take into account external force such as wind pressure can be defined as a function of a total drive torque Tt of motor units 6, a vehicle mass m, a tire radius r and a reduction ratio R, as will be discussed below. A reduction ratio R used herein means that a resulting reduced speed will be 1/R times as low as an input speed. In this case, it can be assumed that there is a wheel slip when a detected angular acceleration of a wheel 2 exceeds the theoretical angular acceleration w. Specifically, a reducer unit output torque is (total drive torque of all motor units Tt)×(reduction ratio R) and can therefore be expressed as Tt×R. The propulsion force F generated at a tire/road contact point when traveling on a flat terrain has a value that is equal to a reducer unit output torque Tt×R as divided by a tire radius r and can therefore be expressed as Tt×R×1/r. Then, a theoretical acceleration α can be expressed as Tt×R×1/r×1/m, since α=F/m according to the relation F=mα. Hence, conversion of the theoretical acceleration α into the theoretical angular acceleration w involves division of the acceleration α by a tire radius r and can therefore be expressed as Tt×R×1/r×1/m×1/r, which can be further organized as R×Tt/m/r². Multiplication of the theoretical angular acceleration w with a coefficient k1 will produce the right side of the aforementioned formula (1), where the coefficient k1 is designed to take into account external force, such as wind pressure, to also take into account the effect of possible loss in a drive line system, and to accept some level of slip, if any.

The angular acceleration monitor 37 may constantly monitor whether or not an angular acceleration detected by the angular acceleration detector 39 is equal to or smaller than an acceptable angular acceleration W. The acceptable angular acceleration W may be produced by multiplying the aforementioned theoretical acceleration w with a coefficient k1 designed to, for example, accept some level of slip, if any. The slip-responsive controller 38 may, if it is determined that the acceptable angular acceleration W is exceeded, cause the motor controller 33 to reduce a drive torque of a motor unit 6. Such a configuration of reducing a drive torque 6 in the event of slip may prevent possible increase of abnormal torque caused by such slip. This is also true when the motor controller 33 performs closed-loop torque control, thereby leading to stable travel. If the coefficient k1 was chosen to be equal to 1, even the slightest slip would trigger the aforementioned torque reduction. Thus, it is desirable to choose the coefficient k1 to be no less than 1. On the other hand, if the coefficient k1 was chosen to be too high, say, equal to or more than 2, the meaningful, slip prevention effect would be lost. Thus, it is desirable to choose the coefficient k1 to have, within the range of 1 to 2, a certain value which can be appropriately decided based on experiments and/or simulations. The level to which a drive torque is reduced as triggered by the slip-responsive controller 38 may be decided as desired.

An acceptable angular acceleration W according to the aforementioned formula (1) is suited to use for travel on a flat terrain. For travel on a slope, an acceptable angular acceleration W according to the aforementioned formula (2) or (3), which takes into account a climbing angle a, may be employed. If the climbing angle detector 41 is provided, a value detected by the climbing angle detector 41 may be used to determine the climbing angle a. If a climbing angle detector 41 is not provided, it may be contemplated to use a maximum climbing angle as specified for the vehicle.

Where the electric vehicle control device 20 employs the aforementioned formula (2), the value of an acceleration component as a function of the vehicle climbing angle a—which can be expressed as "mg×sin(a)/m/r"—is added to an acceleration component for travel on a flat terrain, to produce an acceptable angular acceleration W with which the monitoring is carried out. Thus, more appropriate slip determination may be performed by the angular acceleration monitor 37. Therefore, torque reduction may be more effective in preventing possible slip and in preventing possible increase of abnormal torque caused by slip. Moreover, where a climbing angle detector 41 is provided to detect an actual climbing angle a for use in control, more accurate slip determination based on the climbing angle a may be performed. When, in the electric vehicle control device 20, the slop angle a detected by the climbing angle detector 41 is zero, i.e., when travelling on a flat terrain, the value of an acceleration component as a function of the vehicle climbing angle a—which can be expressed as "mg×sin(a)/m/r"—is also zero. In such a case, the angular acceleration monitor 37 will, in effect, perform determination in the same manner as it does where the electric vehicle control device 20 employs the aforementioned formula (1). Other feature(s) and/or advantage(s) that may be offered by the electric vehicle control device 20 employing the aforementioned formula (2) will be the same as the feature(s) and/or advantage(s) that may be offered by the electric vehicle control device 20 employing the aforementioned formula (1).

Where the electric vehicle control device 20 employs the aforementioned formula (3), the value of an acceleration component as a function of the vehicle climbing angle a1 as specified by specifications of the vehicle—which can be expressed as "mg×sin(a1)/m/r"—is added to an acceleration component for travel on a flat terrain, to produce an acceptable angular acceleration W with which the monitoring is carried out. Thus, a maximum vehicle climbing angle a1 as specified by specifications of the vehicle is taken into consideration to produce an acceptable angular acceleration W. In this case, false slip determination when travelling on an upward slope may be prevented, thus avoiding unwanted torque reduction. Moreover, in such a case where determination is based on a maximum vehicle climbing angle a as specified by specifications, the provision of the climbing angle detector 41 may be unnecessary. This may result in a simplified configuration. Other feature(s) and/or advantage(s) that may be offered by the electric vehicle control device 20 employing the aforementioned formula (3) will be the same as the feature(s) and/or advantage(s) that may be offered by the electric vehicle control device 20 employing the aforementioned formula (1).

Where the electric vehicle control device employs the aforementioned formula (4), respective maximum torques are used to determine a sum of torques of all motor units 6. In this case, an acceptable angular acceleration W will be estimated higher than an acceptable angular acceleration W calculated using actual drive torques. Thus, this may prevent excessive triggering of torque reduction for preventing possible slip and possible increase of abnormal torque caused by slip. Other feature(s) and/or advantage(s) that may be offered by the electric vehicle control device 20 employing the aforementioned formula (4) will be the same as the feature(s) and/or advantage(s) that may be offered by the electric vehicle control device 20 employing the aforementioned formula (1).

Where the electric vehicle control device 20 employs the aforementioned formula (5), too, respective maximum torques are used to determine a sum of torques of all motor units 6. In this case, an acceptable angular acceleration W will likewise be estimated higher than an acceptable angular acceleration W calculated using actual drive torques. Thus, this may prevent excessive triggering of torque reduction for preventing possible slip and possible increase of abnormal torque caused by slip. Furthermore, as is the case with the electric vehicle control device 20 employing the aforementioned formula (2), the value of an acceleration component as a function of the vehicle climbing angle a—which can be expressed as "mg×sin(a)/m/r"—is added to an acceleration component for travel on a flat terrain, to produce an acceptable angular acceleration W with which the monitoring is carried out. Thus, more appropriate slip determination when travelling on a slope may be performed by the angular acceleration monitor 37. Therefore, torque reduction may be more effective in preventing possible slip and in preventing possible increase of abnormal torque. Moreover, where a climbing angle detector 41 is provided to detect an actual climbing angle a for use in control, more accurate slip determination based on the climbing angle a may be performed. Other feature(s) and/or advantage(s) that may be offered by the electric vehicle control device 20 employing the aforementioned formula (5) will be the same as the feature(s) and/or advantage(s) that may be offered by the electric vehicle control device 20 employing the aforementioned formula (1) or (2).

Where the electric vehicle control device 20 employs the aforementioned formula (6), too, respective maximum torques are used to determine a sum of torques of all motor units 6. In this case, an acceptable angular acceleration W will likewise be estimated higher than an acceptable angular acceleration W calculated using actual drive torques. Thus, this may prevent excessive triggering of torque reduction for preventing possible slip and possible increase of abnormal torque caused by slip. Furthermore, as is the case with the electric vehicle control device 20 employing the aforementioned formula (3), the value of an acceleration component as a function of the vehicle climbing angle a—which can be expressed as "mg×sin(a)/m/r"—is added to an acceleration component for travel on a flat terrain, to produce an acceptable angular acceleration W with which the monitoring is carried out. Thus, a maximum vehicle climbing angle a1 as specified by specifications of the vehicle is taken into consideration to produce an acceptable angular acceleration W. In this case, false slip determination when travelling on an upward slope may be prevented, thus avoiding unwanted torque reduction. Moreover, in such a case where determination is based on a maximum vehicle climbing angle a1 as specified by specifications, the provision of the climbing angle detector 41 may be unnecessary. This may result in a simplified configuration. Other feature(s) and/or advantage(s) that may be offered by the electric vehicle control device 20 employing the aforementioned formula (6) will be the same as the feature(s) and/or advantage(s) that may be offered by the electric vehicle control device 20 employing the aforementioned formula (1) or (3).

In one embodiment of the present invention, the motor unit 6 may be configured to drive a wheel 2 of the electric vehicle independently of other wheels. In an electric vehicle, torque control of highly responsive motor unit(s) 6 may be implemented. Thus, in a vehicle whose wheels 2 are independently motor-driven, a load applied to a particular drive wheel 2 may decrease due to, for example, loss of contact with a road surface. And this may result in unwanted acceleration of a motor unit 6 equipped to that particular wheel 2. In such a situation, control by which a torque is reduced upon acceleration-based determination according to the present invention may be all the more effective in achieving stable travel of the vehicle.

In one embodiment of the present invention, in the case of the electric vehicle in which the wheels 2 are driven independently of each other with motor units 6, the slip-responsive controller 38 may be configured to cause the motor controller 33 to reduce a drive torque of only a motor unit 6 that drives a wheel rotating at an angular acceleration detected by the angular acceleration detector 39 greater than the acceptable angular acceleration W. As just discussed, in a vehicle whose wheels 2 are independently motor-driven, unwanted acceleration of the motor unit 6 equipped to a particular drive wheel 2 may occur due to, for example, loss of contact with a road surface. In such a situation, it is advantageous to cause the motor controller 33 to reduce a drive torque of only such accelerated motor unit(s) 6, in order to achieve stable travel of the vehicle.

In one embodiment of the present invention, the motor unit 6 may, together with a reducer unit 7, form an in-wheel motor drive system 8 that is partly or entirely disposed within the wheel 2, and wherein the in-wheel motor drive system 8 may include the motor unit 6 and the reducer unit 7. The electric vehicle may include a reducer unit 7 configured to reduce speed of rotation of the motor unit 6, with the reducer unit having a high reduction ratio of 4 or greater. The electric vehicle may include a reducer unit 7 configured to reduce speed of rotation of the motor unit 6, with the reducer unit 7 including a cycloidal reducer. In an electric vehicle with an in-wheel motor drive system, each wheel 2 may be driven, independently of other wheel(s) 2, with a highly responsive motor unit 6. Thus, the stable travel of such a vehicle may considerably depend on whether slip-responsive control of each drive wheel will be appropriately performed. In such a situation, slip reduction according to the present invention may be all the more effective in achieving stable travel of the vehicle. Furthermore, in a configuration where a reducer unit 7 (e.g., a reducer unit 7 of an in-wheel motor drive system 8) includes a cycloidal reducer with a high reduction ratio, the provision of smaller motor unit(s) 6 may be possible. This, at the same time, means that a correspondingly amplified torque will be transmitted from the motor unit(s) 6 to wheel(s). In such a situation, it may be all the more important to prevent possible slip of tire(s) and prevent possible increase of abnormal torque caused by slip.

In one embodiment of the present invention, an angular acceleration detector 39 may be provided which is configured to output a torque command value, based on signals outputted from an acceleration and deceleration manipulator, wherein the slip-responsive controller 38 may be configured to, if an angular acceleration detected by the angular acceleration detector 39 is greater than a set upper limit of angular acceleration, cause the torque command value to be reduced.

In such a configuration, the slip-responsive controller 38 may define an upper limit of angular acceleration of a wheel for use in slip determination, as a function of a vehicle mass and an output torque, and may, if that upper limit is exceeded, determine that there is slip and cause the torque command value to be reduced accordingly. Such a configuration may enable setting an upper limit of angular acceleration for use in slip determination—i.e., a threshold—to an optimal value. In this way, the threshold may no longer be needlessly on the safer side, thereby maximizing grip of tire(s).

In one embodiment of the present invention, the slip-responsive controller 38 may be configured to determine and set the upper limit of angular acceleration based solely on an output torque, where the vehicle mass is a fixed value. Such a configuration in which a fixed value is used for the vehicle mass may enable a simplified configuration of the slip-responsive controller 38 and/or may eliminate the need to provide a sensor system to measure a vehicle mass.

In one embodiment of the present invention, respective wheel bearing units of two front and two rear wheels of the vehicle may be associated with respective load sensors 46, and the slip-responsive controller 38 may be configured to use a vehicle mass measured in real time by the load sensors 46 to determine and set the aforementioned upper limit. With such a configuration, a vehicle mass that varies with, for example, the number of passengers and the carrying load, may be determined in real time to determine the aforementioned upper limit for use in slip determination. This may allow the upper limit to be set to a more optimal value, thereby even more maximizing grip of tire(s).

In the present invention, the slip-responsive controller 38 may be configured to vary amount of torque reduction, according to a degree by which an angular acceleration of a wheel exceeds the aforementioned upper limit. A fixed amount of torque reduction may be triggered by the slip-responsive controller 38, and this adequately leads to appropriate slip control. Nevertheless, a configuration where the amount of torque reduction is varied according to a degree by the aforementioned upper limit is exceeded, may prevent possible, needless torque reduction, thus enabling more appropriate slip control to be performed.

In the present invention, an electric vehicle may include motor units configured to drive two or more wheels independently of each other, and the aforementioned electric vehicle control device 20, such that corresponding wheels are controllable independently of each other by the slip-responsive controller 38. Typically, slip occurs to one wheel at a time. Thus, where motor units are provided which are configured to drive two or more wheels 2 independently of each other, performing slip control independently for each wheel may prevent possible, unnecessary reduction of travelling drive force. Note that such slip control is designed to enable a wheel 2 having poor tire grip due to slip to recover proper tire grip. Hence, even if that slip control reduces a torque command value for only one of left and right wheels 2, the resulting balance of travelling drive force between left and right sides of the vehicle will be better than the balance of travelling drive force between left and right sides of the vehicle when there is ongoing slip.

The present invention may provide an electric vehicle including an electric vehicle control device 20 having any one of the aforementioned configurations. Such an electric vehicle may, with the implementation of slip control by an electric vehicle control device 20 according to the present invention, be able to employ an upper limit of angular acceleration—i.e., a threshold—for use in slip determination, that is not needlessly situated on the safer side. This may maximize grip of tire(s). In this way, possible, unnecessary reduction of speed may be prevented, thereby leading to stable travel of the vehicle while maintaining reduced chance of slip.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
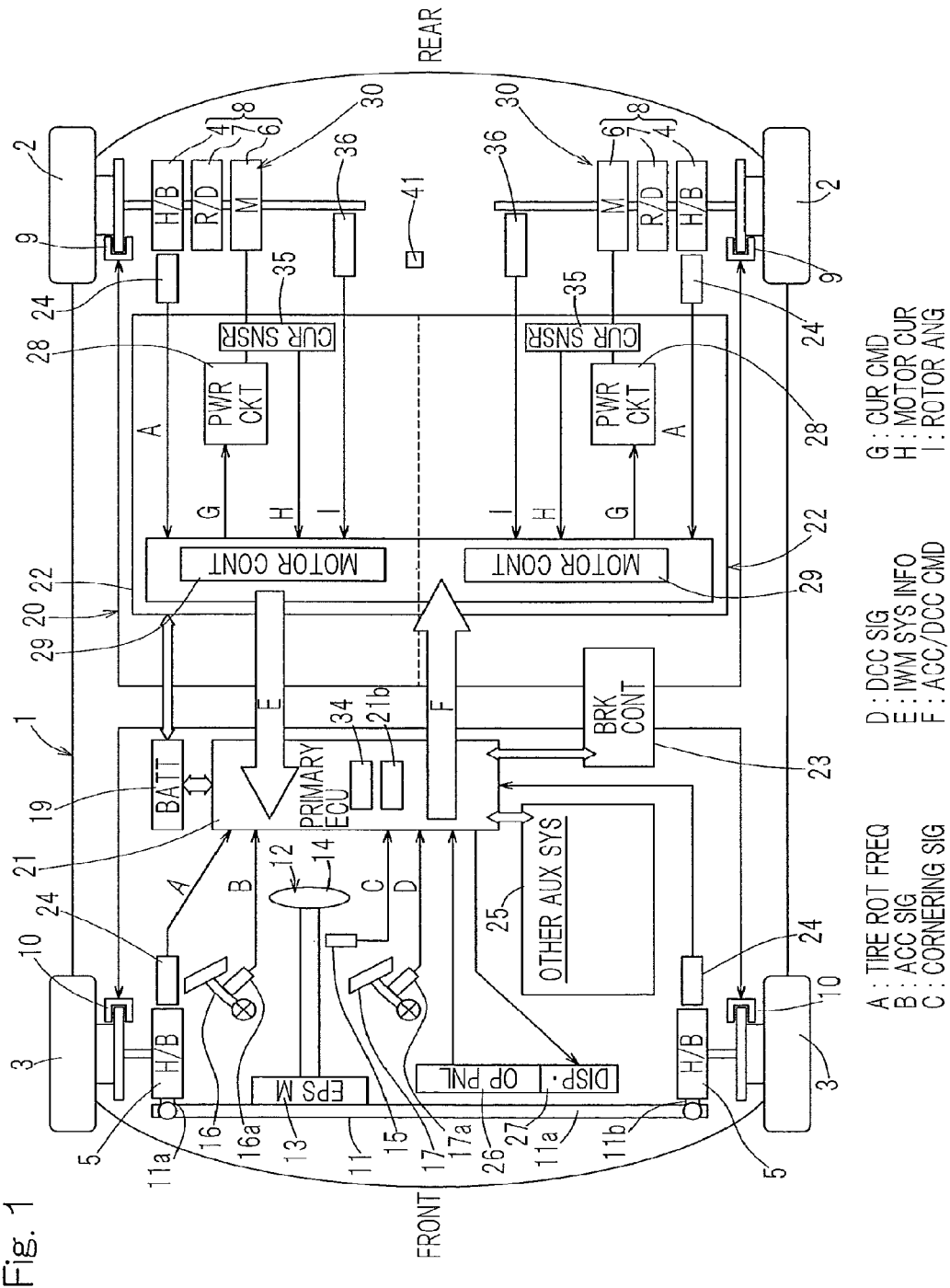
FIG. 1 is a block diagram of a schematic configuration of an electric vehicle with an electric vehicle control device, on a plan view, according to the first embodiment of the present invention.

The first embodiment of the present invention will now be described in connection with FIG. 1 to FIG. 8. The illustrated electric vehicle is a four-wheel vehicle that includes a vehicle body 1 with left and right rear wheels 2 and left and right front wheels 3, with the rear wheels 2 being drive wheels and the front wheels 3 being steered driven wheels. The wheels 2, 3—that is, drive wheels and driven wheels, respectively—are all equipped with tires and are supported by the vehicle body 1 via respective wheel bearing units 4, 5. In FIG. 1, the wheel bearing units 4, 5 are labeled with "H/B" which is an abbreviation for a hub bearing. The left and right drive wheels 2, 2 may be driven by respective independent traction motor units 6, 6. Rotation of a motor unit 6 may be transmitted via a reducer unit 7 and through a wheel bearing unit 4 to a wheel 2. The motor unit 6, the reducer unit 7 and the wheel bearing unit 4 may be integrally assembled with each other to form an in-wheel motor drive system 8. The in-wheel motor drive system 8 may be partly or entirely disposed within a wheel 2. The in-wheel motor drive system 8 may often be referred to as an in-wheel motor unit. The motor unit 6 may, without the interposition of the reducer unit 7, directly drive the wheel 2 into rotation. The wheels 2, 3 may be equipped with respective brakes 9, 10 that may be electrically driven.

The left and right front steered wheels 3, 3 may be turnable via a turning mechanism 11 and steered with a steering mechanism 12. The turning mechanism 11 may include left and right knuckle arms 11b holding the respective wheel bearing units 5 and may also include a tie rod structure 11a configured to be laterally displaced to change the angles of the left and right knuckle arms 11b. An EPS (Electric Power Steering) motor 13 may be driven according to a command from the steering mechanism 12, to cause, via a rotary to linear motion converter mechanism (not shown), the lateral movement of the tie rod structure 11a. A steering angle may be sensed by a steering angle sensor 15. The sensor output from the steering angle sensor 15 may be sent to an ECU 21. The ECU 21 may utilize that information in generating an accelerating/decelerating command for left and/or right wheels.

A control system will be discussed. As illustrated, the vehicle body 1 may be equipped with the ECU 21 which is an electronic control unit configured to perform general control of the vehicle, an inverter unit 22 configured to perform control of the traction motor units 6 according to commands from the ECU 21, and a braking controller unit 23. The ECU 21 may include a computer, programs that may be executed by the computer, and various electronic circuits. In the embodiment under discussion, an electric vehicle control device 20 may be formed generally of the ECU 21 and the inverter unit 22.

The ECU 21 may include a torque command generator 34 and a general control subunit 21b. The torque command generator 34 may be configured to generate an accelerating/decelerating command, which will be transmitted to the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. The torque command generator 34 may also be configured to correct the accelerating/decelerating command, based on information produced from sensor(s) that may be mounted to the vehicle such as information indicating a rotational frequency of a tire produced from a rotation sensor 24 that may be operatively associated with each of the wheel bearing units 4, 5 equipped to the wheels 2, 3. The accelerator manipulation unit 16 may include an accelerator pedal and a sensor 16a configured to sense the depression of the accelerator pedal to generate the aforementioned accelerating signal. The brake manipulation unit 17 may include a brake pedal and a sensor 17a configured to sense the depression of the brake pedal to generate the aforementioned decelerating signal.

The general control subunit 21b of the ECU 21 may be configured to output to the braking controller unit 23 a decelerating signal produced from the brake manipulation unit 17, control various auxiliary systems 25, process input signals from an operation panel 26 on a console, cause a display 27 to show information, and/or etc. Examples of the auxiliary systems 25 may include an air conditioner, a lamp, a wiper, a GPS, and an airbag. In FIG. 1, the auxiliary systems 25 are indicated as a whole with a single block.

The braking controller unit 23 may be configured to send a braking command to each of the brakes 9, 10 equipped to the wheels 2, 3, according to a decelerating signal outputted from the ECU 21. The ECU 21 may produce a braking-related command including, other than a command generated based on the decelerating signal produced from the brake manipulation unit 17, a command generated by a safety enhancement subunit that may be included in the ECU 21. The braking controller unit 23 may include an anti-lock-braking system. The braking controller unit 23 may include electronic circuits and/or a microcomputer.

The inverter unit 22 may include a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor drive system 8 (which may be referred to as "IWM system information") held by the motor control circuitry 29, such as a variety of detected values or various control values, to the ECU 21.

Figure 2:
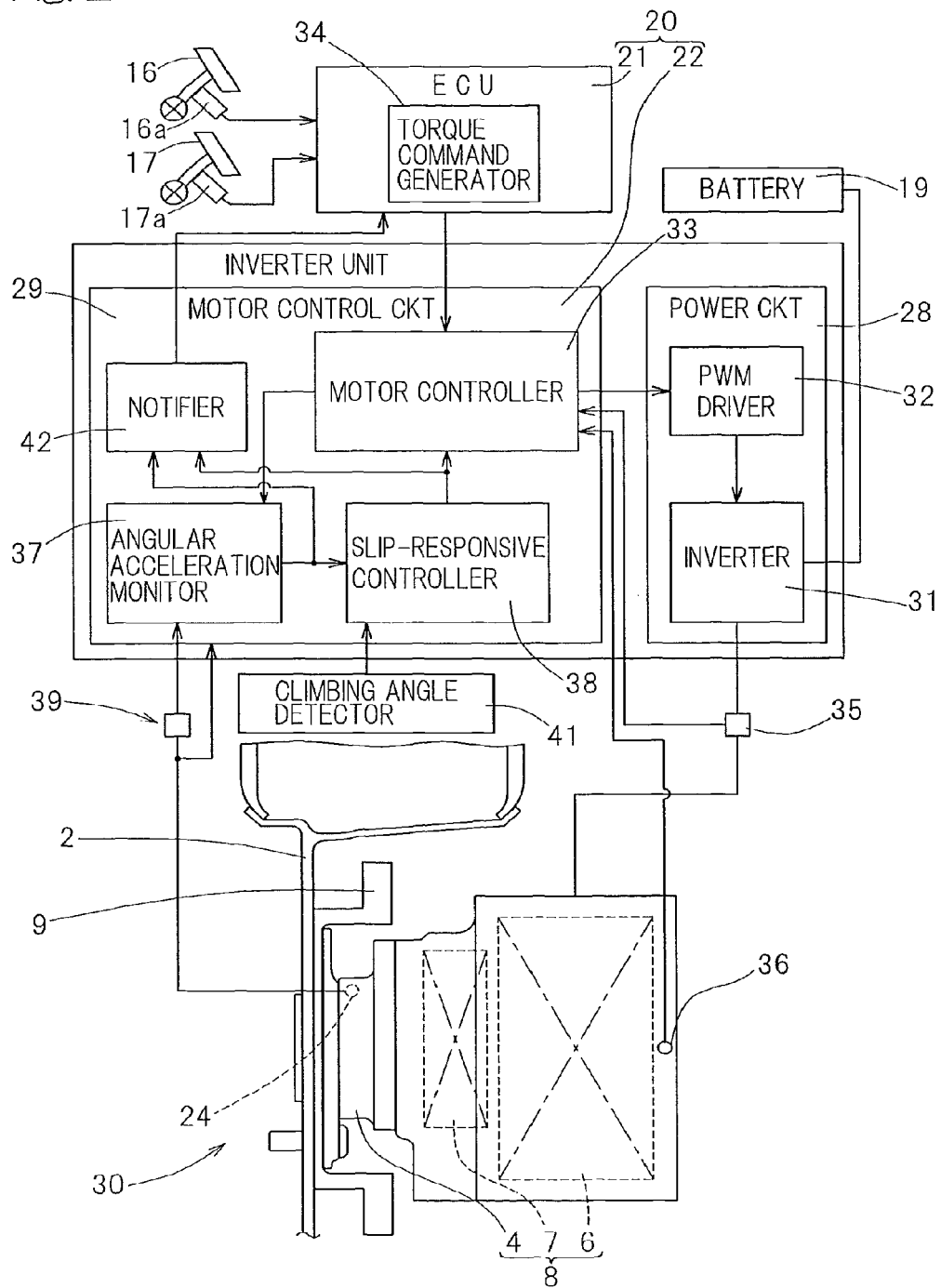
FIG. 2 is a block diagram of a schematic configuration of an inverter unit in the electric vehicle control device for the electric vehicle.

FIG. 2 is a block diagram of a schematic configuration of the inverter unit 22. As illustrated, the power circuitry 28 may include an inverter 31 configured to convert a DC power outputted from a battery unit 19 into a three-phase AC power used to drive the motor unit 6 and may include a PWM driver 32 configured to control the inverter 31. The motor unit 6 may include a three-phase Interior Permanent Magnet synchronous motor. The inverter 31 may include a plurality of semiconductor switching devices (not shown). The PWM driver 32 may be configured to perform pulse width modulation on a received current command to generate an ON/OFF command for each of the semiconductor switching devices.

The motor control circuitry 29 may include a computer, programs that are executed by the computer, and various electronic circuits. The motor control circuitry 29 may include a motor controller 33 which serves as a basic control component. The motor controller 33 may be configured to receive an accelerating/decelerating command in the form of a torque command from the torque command generator 34 of the ECU 21 which serves as an upper-level control unit, convert the accelerating/decelerating command into a current command, and send the current command to the PWM driver 32 of a power circuitry 28. The motor controller 33 may be configured to perform a current feedback control based on the value of a motor current that flows from the inverter 31 to the motor unit 6 as sensed with a current sensor 35. The motor controller 33 may be configured to obtain a rotational angle of a motor rotor in the motor unit 6 as determined by an angle sensor 36 to perform control such as a vector control that relies on a rotational angle.

In the embodiment under discussion, the motor control circuitry 29 includes an angular acceleration monitor 37, a slip-responsive controller 38 and a notifier 42—which will be discussed later in detail. Moreover, an angular acceleration detector 39 configured to detect an angular acceleration of the wheel 2 driven by the motor unit 6, as well as a climbing angle detector 41, are operatively provided.

The angular acceleration detector 39 may, for example, be configured to calculate a derivative of the detected value of a rotational frequency of a tire as produced from the rotation sensor 24 to detect an angular acceleration. The angular acceleration detector 39 may be included in the motor control circuitry 29 as a part of the motor control circuitry 29, or may be provided as a sensor independent or separate from the motor control circuitry 29. The climbing angle detector 41 may, for example, be a gyro sensor configured to sense an attitude of the vehicle body 1 of the vehicle. The climbing angle detector 41 may be mounted to the vehicle body 1 at a certain location as desired. However, the climbing angle detector 41 may not be limited to a configuration designed to sense an attitude of the vehicle body 1; in a variant, the climbing angle detector 41 may be configured to monitor a drive line system to detect the climbing angle.

The angular acceleration monitor 37 may monitor whether or not an angular acceleration of the wheel 2 detected by the angular acceleration detector 39 is equal to or smaller than an acceptable angular acceleration W (rad/s²) that is calculated with the following formula (2):

$$W = k2 \times R \times Tt/m/r^2 + mg \times \sin(a)/m/r \qquad (2)$$

where k2 is a constant that takes an arbitrary value in the range of 1 to 2 and g is a gravitational acceleration;

where Tt is a total drive torque that is a sum of drive torques of all motor units 6 that drive wheels 2, m is a vehicle mass, r is a tire radius, R is a reduction ratio of a reducer unit 7 interposed between the motor unit 6 and the wheel 2, and a is a vehicle climbing angle detected by the climbing angle detector 41. The vehicle climbing angle a takes a negative value in the case of a downward slope.

The units used to express the aforementioned quantities are, respectively, Tt (Nm), m (kg), r (m), a (rad) and W (rad/s²) (the same applies below).

Note that, when travelling on a flat terrain, the value of a term "sin(a)/m/r" on the right side of the aforementioned formula (2) is zero. In such a case, the angular acceleration monitor 37 will, in effect, monitor whether or not the detected angular acceleration is equal to or smaller than an acceptable angular acceleration W that is calculated with the following formula (1):

$$W = k1 \times R \times Tt/m/r^2 \qquad (1)$$

where k1 is a constant that takes an arbitrary value in the range of 1 to 2.

In the angular acceleration monitor 37, the motor controller 33 of an inverter unit 22 may receive the value of the latest motor drive torque—which may be obtained based on the value of current as sensed with an ammeter 35—from inverter unit(s) 22 associated with all motor units 6 of the vehicle, and to calculate a sum of all motor drive torques to determine a value of the total drive torque Tt. In a variant, the ECU 21 may calculate a sum of all motor drive torques obtained by the motor controllers 33 of respective inverter units 22, and send the resulting total drive torque Tt to angular acceleration monitors 37 of the respective inverter units 22.

Figure 5A:
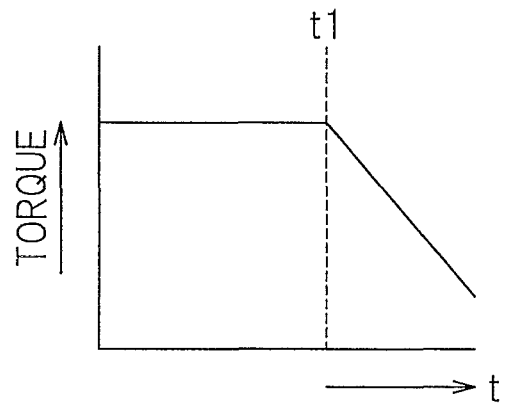
FIG. 5A is a graph that shows an example of how a torque may be reduced as triggered by a slip-responsive controller in the electric vehicle control device for the electric vehicle.
Figure 5B:
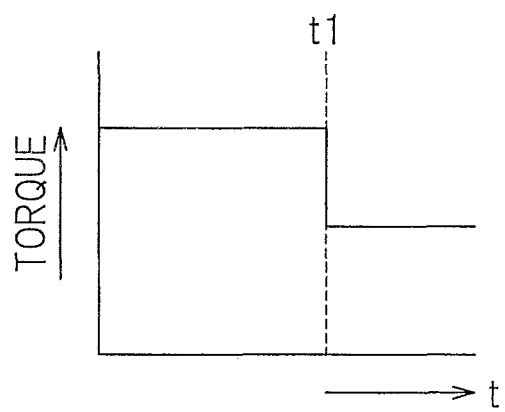
FIG. 5B is a graph that shows another example of how a torque may be reduced as triggered by a slip-responsive controller in the electric vehicle control device for the electric vehicle.

The slip-responsive controller 38 may, when the angular acceleration monitor 37 determines that the detected angular acceleration is greater than the acceptable angular acceleration W, cause the motor controller 33 to reduce a drive torque of the motor units. The slip-responsive controller 38 may cause a drive torque to be reduced according to a rule that is defined as desired. In one example as shown in FIG. 5A, a drive torque may be caused to be gradually reduced starting from the time t=t1 when it is determined that the acceptable angular acceleration W is exceeded. In another example as shown in FIG. 5B, a drive torque may be reduced by a defined proportion at the time t=t1 when it is determined that the acceptable angular acceleration W is exceeded. The level to which a drive torque is caused to be reduced may be defined as desired, for example, by performing experiments and/or simulations to determine an optimal value. The slip-responsive controller 38 may halt control to reduce a drive torque, when the angular acceleration monitor 37 determines that a detected angular acceleration becomes equal to or smaller than the acceptable angular acceleration W.

Referring to FIG. 2, the notifier 42 may notify the ECU 21 of the determination result by the angular acceleration monitor 37 that the acceptable angular acceleration W is exceeded and of information related to the control performed by the slip-responsive controller 38 to cause a drive torque to be reduced. Upon receipt of the notification, the ECU 21 may carry out—for example, through the torque command generator 34—integrated control of the vehicle as a whole. In addition or in a variant, upon receipt of the notification from the notifier 42, the ECU 21 may cause the display 27—which may be provided at a driver's seat—to show on a screen, for example, the indication that there is ongoing slip or that a torque is being reduced responsive to the slip.

The detection of slip as well as a measure taken in response to slip according to the aforementioned configuration will be discussed below in connection with FIG. 3A through FIG. 4B. A theoretical angular acceleration w of a wheel 2 that does not take into account external force such as wind pressure can be defined based on a total drive torque Tt of the motor units 6, a vehicle mass m, a tire radius r and a reduction ratio R, as will be discussed below. In this case, it can be assumed that there is a wheel slip if a detected angular acceleration of a wheel 2 exceeds the theoretical angular acceleration w.

Figure 3A:
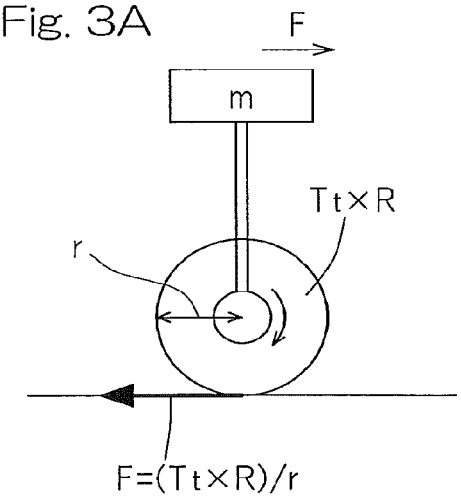
FIG. 3A is a schematic diagram that shows a relationship between torque and acceleration for the electric vehicle.
Figure 3B:
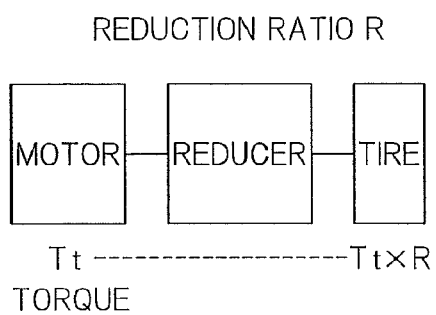
FIG. 3B is a block diagram that shows a relationship between torque and acceleration for the electric vehicle.

Specifically, as can be seen from FIG. 3A, the reducer 7 unit outputs torque represented as (total drive torque of all motor units Tt)×(reduction ratio R), which can therefore be expressed as Tt×R. The propulsion force F generated at a tire/road contact point when traveling on a flat terrain has a value that is equal to a reducer unit output torque Tt×R as divided by a tire radius r and can therefore be expressed as Tt×R×1/r. A theoretical acceleration α can be expressed as Tt×R×1/r×1/m since α=F/m according to the relation F=ma. Hence, conversion of the theoretical acceleration α into the theoretical angular acceleration w involves division of the acceleration α by a tire radius r and can therefore be expressed as Tt×R×1/r×1/m×1/r, which can be further organized as R×Tt/m/r². Multiplication of the theoretical angular acceleration w with a coefficient k1 will produce the right side of the aforementioned formula (1), where the coefficient k1 is designed to take into account external force, such as wind pressure, to also take into account the effect of possible loss in a drive line system, and to accept some level of slip, if any. Note that the right side of the formula (1) corresponds to the first term on the right side of the aforementioned formula (2), except that in the formula (2) the coefficient k2 is used instead.

Figure 4A:
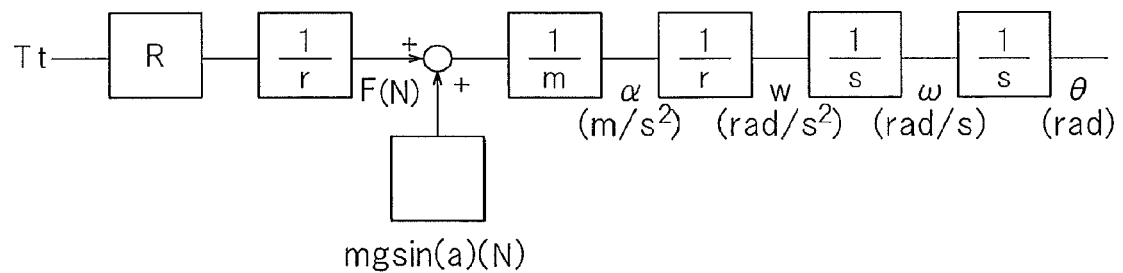
FIG. 4A is another block diagram that shows a relationship between torque and acceleration for the electric vehicle.
Figure 4B:
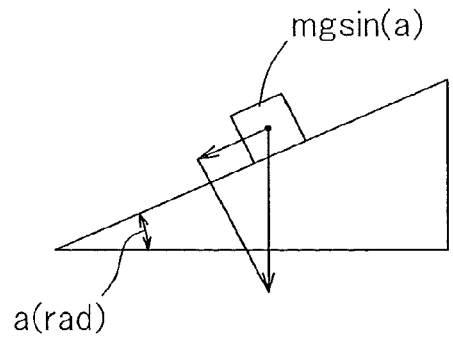
FIG. 4B is an explanatory diagram of how the force may act when the electric vehicle travels on a slope.

As can be seen from FIG. 4B, when travelling on a slope, the force mg×sin(a) caused by the combination of a vehicle mass m and a road surface inclination angle a (rad) will be added to the aforementioned propulsion force F (N). The acceleration component incurred by this additional force mg×sin(a)/m/r constitutes the second term on the right side of the aforementioned formula (2).

Hence, when travelling on a slope, it can be estimated that there is slip when a detected angular acceleration is greater than an acceptable angular acceleration W calculated according to the aforementioned formula (2):

$$W = k2 \times R \times Tt/m/r^2 + mg \times \sin(a)/m/r \qquad (2)$$

Note that, when travelling on a flat terrain, the value of an acceleration component as a function of the vehicle climbing angle a—which can be expressed as "mg×sin(a)/m/r"—is zero. Therefore, the use of the formula (2) enables estimation of the presence or absence of slip, whether traveling on a flat terrain or on a slope.

The angular acceleration monitor 37 may constantly monitor whether or not an angular acceleration detected by the angular acceleration detector 39 is equal to or smaller than an acceptable angular acceleration W. The acceptable angular acceleration W may be produced by multiplying the aforementioned theoretical acceleration w with a coefficient k2 designed to, for example, accept some level of slip, if any. The slip-responsive controller 38 may, if it is determined that the acceptable angular acceleration W is exceeded, cause the motor controller 33 to reduce a drive torque of the motor unit 6. Such a configuration of reducing a drive torque in the event of slip may prevent possible increase of abnormal torque caused by such slip, thereby leading to stable travel. If the coefficient k1 or k2 was chosen to be equal to 1, even the slightest slip would trigger the aforementioned torque reduction. Thus, it is desirable to choose the coefficient k1 or k2 to be no less than 1. On the other hand, if the coefficient k1 or k2 was chosen to be too high, say, equal to or more than 2, the meaningful prevention effect of possible slip and possible increase of abnormal torque would be lost. Thus, it is desirable to choose the coefficient k1 or k2 to have, within the range of 1 to 2, a certain value which can be appropriately decided based on experiments and/or simulations.

Thus, with the aforementioned configuration, appropriate slip determination may be performed by the angular acceleration monitor 37 whether travelling on a flat terrain or on a slope. Therefore, torque reduction may be more effective in preventing possible slip and in preventing possible increase of abnormal torque caused by slip. Moreover, with the provision of the climbing angle detector 41 to detect an actual climbing angle a for use in control, more accurate slip determination based on the climbing angle a may be performed.

Although, in the aforementioned example, a climbing angle a detected by the climbing angle detector 41 is used for control, a maximum vehicle climbing angle a1—as specified by specifications of the vehicle intended to make sure that possible influence of a climbing angle is accounted for in advance—may be used instead. Thus, the angular acceleration monitor 37 may monitor whether or not an angular acceleration of the wheel 2 detected by the angular acceleration detector 39 is equal to or smaller than an acceptable angular acceleration W that is calculated with the following formula (3):

$$W = k3 \times R \times Tt/m/r^2 + mg \times \sin(a1)/m/r \qquad (3)$$

where k3 is a constant that takes an arbitrary value in the range of 1 to 2, and a1 is a maximum vehicle climbing angle as specified by specifications of the vehicle.

In this case, too, the value of an acceleration component as a function of the vehicle climbing angle a—which can be expressed as "mg×sin(a)/m/r"—is added to an acceleration component for travel on a flat terrain, to produce an acceptable angular acceleration W with which the monitoring is carried out. More specifically, a maximum vehicle climbing angle a1 as specified by specifications of the vehicle is taken into consideration to produce an acceptable angular acceleration W. In this case, false slip determination when travelling on an upward slope may be prevented, thus avoiding unwanted torque reduction. Moreover, in such a case where determination is based on a maximum vehicle climbing angle a1 as specified by specifications, the provision of the climbing angle detector 41 may be unnecessary. This may result in a simplified configuration.

While, in the preceding examples, respective drive torques of the motor units 6 as they actually operate are chosen for use in slip determination, respective maximum torques of the motor units 6 may be chosen instead. And this may be combined with either one of a detected vehicle climbing angle and a maximum vehicle climbing angle as specified by specifications of the vehicle. Thus, when travelling on a flat terrain, the angular acceleration monitor 37 may monitor whether or not an angular acceleration of the wheel 2 detected by the angular acceleration detector 39 is equal to or smaller than an acceptable angular acceleration W that is calculated with the following formula (4):

$$W = k4 \times R \times Tmaxt/m/r^2 \qquad (4)$$

where Tmaxt is a total maximum torque that is a sum of maximum torques of all motor units that drive wheels 2 of a vehicle and k4 is a constant that takes an arbitrary value in the range of 1 to 2.

When travelling on a slope, the angular acceleration monitor 37 may monitor whether or not an angular acceleration of the wheel 2 detected by the angular acceleration detector 39 is equal to or smaller than an acceptable angular acceleration W that is calculated with the following formula (5):

$$W = k5 \times R \times Tmaxt/m/r^2 + mg \times \sin(a)/m/r \qquad (5)$$

where k5 is a constant that takes an arbitrary value in the range of 1 to 2, g is a gravitational acceleration, and a is a vehicle climbing angle detected by a climbing angle detector 41.

The angular acceleration monitor 37 may monitor whether or not an angular acceleration of the wheel 2 detected by the angular acceleration detector 39 is equal to or smaller than an acceptable angular acceleration W that is calculated with the following formula (6):

$$W = k6 \times R \times Tmaxt/m/r^2 + mg \times \sin(a1)/m/r \qquad (6)$$

where k6 is a constant that takes an arbitrary value in the range of 1 to 2, and a1 is a maximum vehicle climbing angle as specified by specifications of the vehicle.

Where respective maximum torques are used to determine a sum of torques of all motor units 6—as in some of the aforementioned examples—an acceptable angular acceleration W will be estimated higher than an acceptable angular acceleration W calculated using actual drive torques. Thus, this may prevent excessive triggering of torque reduction for preventing possible slip and possible increase of abnormal torque caused by slip.

Now, a particular configuration that the in-wheel motor drive system 8 may take will be described in connection with FIG. 6 to FIG. 8. As illustrated, the in-wheel motor drive system 8 may include a wheel bearing unit 4, a motor unit 6 and a reducer unit 7 interposed between the wheel bearing unit 4 and the motor unit 6, such that the hub of a drive wheel 2 supported by the wheel bearing unit 4 is coupled coaxially with a rotational output shaft 74 of the motor unit 6. As illustrated, the reducer unit 7 may include a cycloidal reducer which includes a rotational input shaft 82 connected coaxially to the rotational output shaft 74 of the motor unit 6. The rotational input shaft 82 may include eccentric segments 82a, 82b. The cycloidal reducer may also include curvilinear plates 84a, 84b mounted via respective bearings 85 to the eccentric segments 82a, 82b, such that the eccentric motions of the curvilinear plates 84a, 84b are transmitted so as to cause a rotary motion of the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 may include an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 may concurrently serve as a hub for mounting a drive wheel. As illustrated, the wheel bearing unit 4 may include a double row angular contact ball bearing, in which the rolling elements 55 are in the form of balls rollingly retained by a retainer 56 that is provided one for each row of the balls. The raceway surfaces 53 and 54 may have arcuate cross sectional shapes and may be formed to have respective contact angles held in back-to-back relation with each other. The outer member 51 and the inner member 52 may define an annular bearing space therebetween, and an outboard end of the annular bearing space may be sealed by a sealing member 57.

The outer member 51, which may serve as a stationary member, may be of one piece construction having a flange 51a for attaching to an outboard housing 83b of the reducer unit 7. The flange 51a may have bolt insertion holes 64 formed at a plurality of circumferential locations thereof. The housing 83b may have bolt receiving holes 94 that are internally threaded at locations thereof corresponding to the respective bolt insertion holes 64. The outer member 51 may be mounted to the housing 83b by screwing into the bolt receiving holes 94 the mounting bolts 65 that are pre-inserted in the bolt insertion holes 64.

The inner member 52, which may serve as a rotational member, may include an outboard member 59 having a hub flange 59a for attaching a wheel. The inner member 52 may include an inboard member 60. The inboard member 60 may have an outboard side fitted to an inner periphery of the outboard member 59 and may be crimped to be integrated with the outboard member 59. The outboard member 59 and the inboard member 60 may have the corresponding rows of the raceway surfaces 54 formed thereon. The inboard member 60 may have a center thereof formed with a through bore 61. The hub flange 59a may have force-fitting holes 67 at a plurality of circumferential locations thereof for receiving corresponding hub bolts 66. The outboard member 59 may have a cylindrical pilot portion 63 for guiding a drive wheel and brake components (both not shown). The pilot portion 63 may be located in the vicinity of the root of the hub flange 59a of the outboard member 59 and may protrude towards the outboard side. A cap 68 closing an outboard end of the through bore 61 may be fitted to an inner periphery of the pilot portion 63.

The reducer unit 7 may include a cycloidal reducer as discussed earlier. As shown in FIG. 7, the cycloidal reducer may include two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 may be fitted to the housing 83b to guide, along the outer peripheries thereof, the eccentric motions of the curvilinear plates 84a and 84b. A plurality of inner pins 88, which may be fitted to the inboard member 60 of the inner member 52, may be inserted to a plurality of corresponding, round through holes 89 formed in each of the curvilinear plates 84a and 84b, to engage with the through holes 89. The rotational input shaft 82 may be splinedly connected to the rotational output shaft 74 of the motor unit 6 for co-rotation. The rotational input shaft 82 may be supported on both sides thereof, via two bearings 90, by an inboard housing 83a and by an inner diameter surface of the inboard member 60 of the inner member 52, respectively.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 engaging with the through holes 89, transmitted to cause a rotary motion of the inner member 52. The speed of rotation of the inner member 52 is reduced with respect to that of rotation of the rotational output shaft 74. For example, a single-stage reducer unit having such a configuration can achieve a reduction ratio of 10 or greater.

The two curvilinear plates 84a, 84b may be mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, may be each disposed at a side of the corresponding one of the eccentric segments 82a, 82b, in such a way that the counterweights 91 face each other across the eccentric segments 82a, 82b while each of the counterweights 91 is displaced in a direction opposite to the direction of displacement of the corresponding one of the eccentric segments 82a, 82b. In this way, vibrations that may be caused by the curvilinear plates 84a, 84b can be cancelled out.

Figure 8:
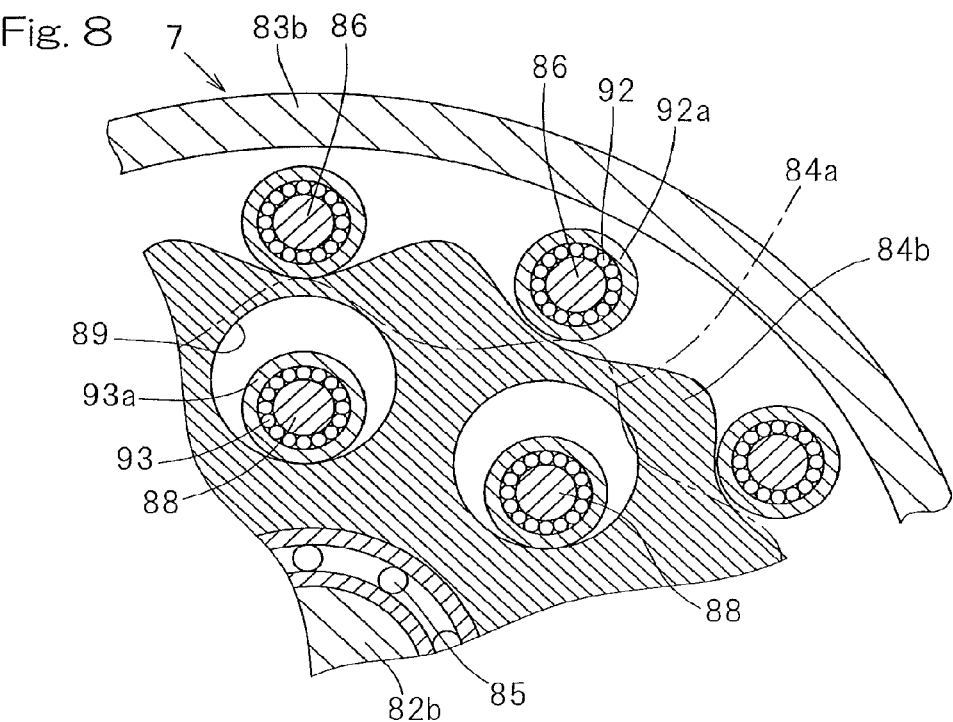
FIG. 8 is a fragmentary enlarged cross sectional view of FIG. 7.

As shown on an enlarged scale in FIG. 8, bearings 92 and bearings 93 may be fitted to the outer pins 86 and the inner pins 88, respectively. The outer rings 92a of the bearings 92 may be in rolling contact with the outer peripheries of the curvilinear plates 84a, 84b, while the outer rings 93a of the bearings 93 may be in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing the eccentric motions of the curvilinear plates 84a, 84b to be more smoothly transmitted to cause a rotary motion of the inner member 52.

Figure 6:
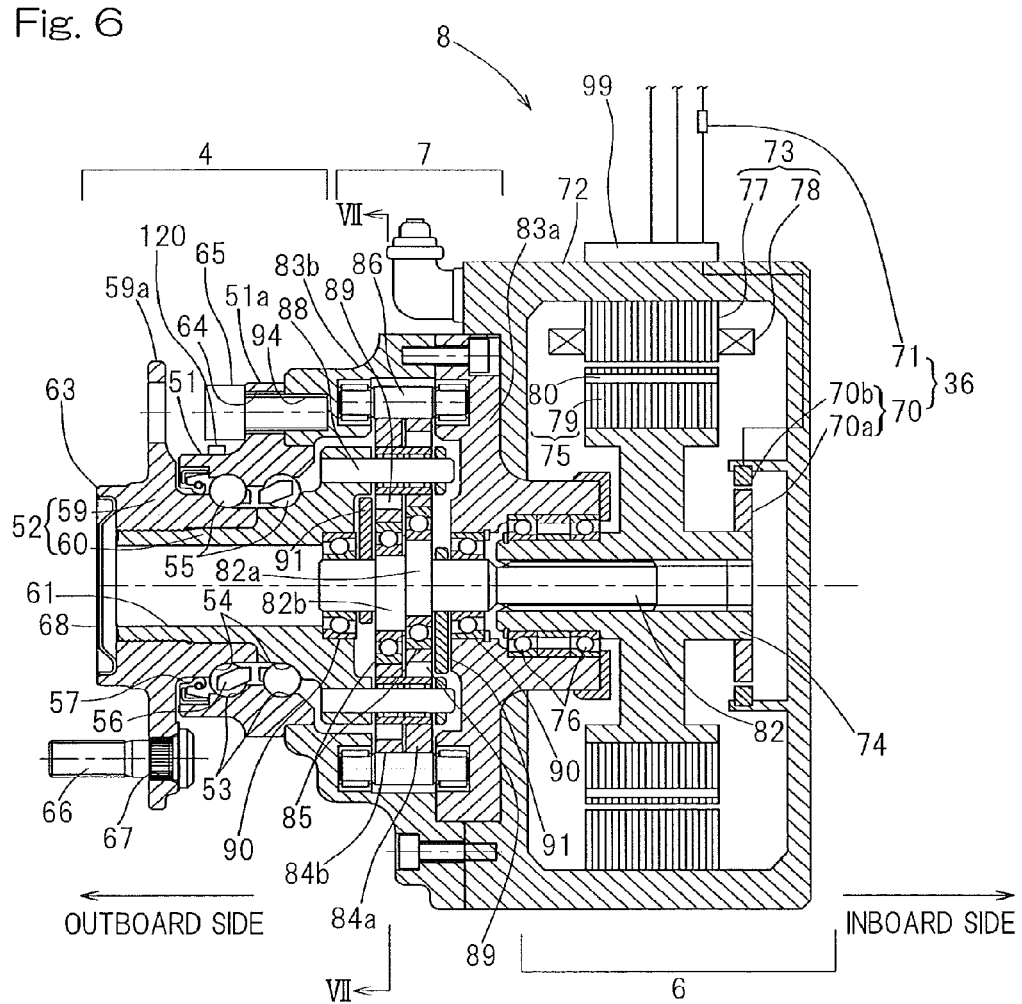
FIG. 6 is a front cut-away view of an in-wheel motor drive system for the electric vehicle.
Figure 7:
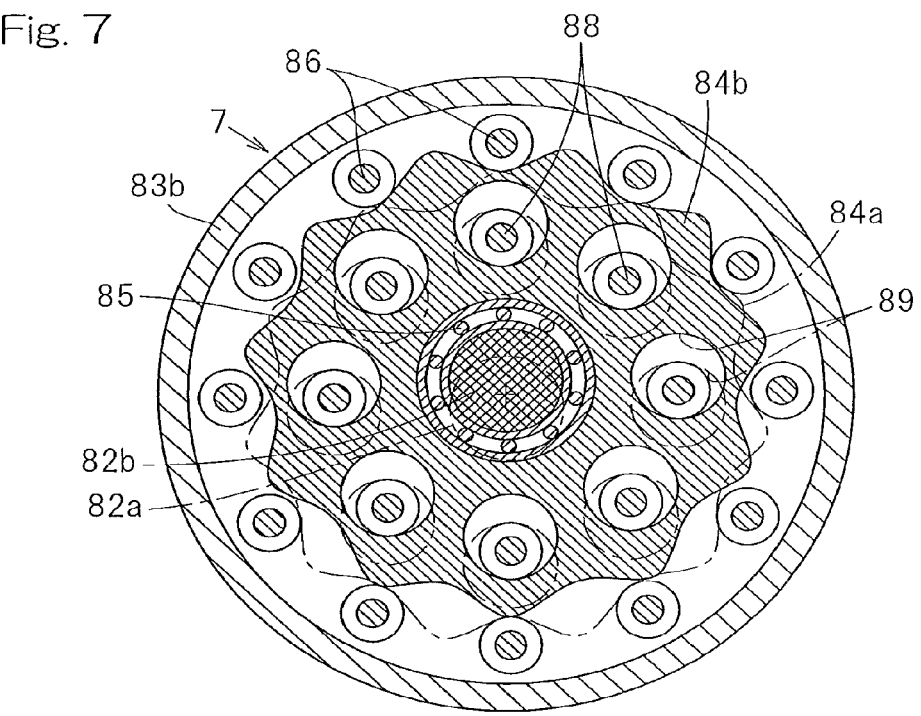
FIG. 7 is a cross sectional view of FIG. 6 taken along the line VII-VII.

As shown in FIG. 6, the motor unit 6 may include a radial-gap type, IPM motor that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 may be cantilevered via two bearings 76 to a tubular segment of the inboard housing 83a of the reducer unit 7.

The motor stator 73 may include a stator core body 77 made of soft magnetic material and may also include coils 78. An outer peripheral surface of the stator core body 77 may be fitted to the inner peripheral surface of the motor housing 72. In this way, the stator core body 77 may be supported by the motor housing 72. The motor rotor 75 may include a rotor core body 79 mounted onto the rotational output shaft 74 to be coaxial with the motor stator 73 and may also include a plurality of permanent magnets 80 incorporated in the rotor core body 79.

The motor unit 6 may be associated with a plurality of angle sensors 36 (for example, two angle sensors). These angle sensors 36 may constitute an angle sensor such as shown in FIG. 1 and FIG. 2. Each of the angle sensors 36 may sense a rotational angle of the motor rotor 75 relative to the motor stator 73. Each of the angle sensors 36 may include an angle sensor body 70 that senses signals representing a rotational angle of the motor rotor 75 relative to the motor stator 73 for output and may also include an angle calculation circuit 71 that calculates a rotational angle based on the signals produced from the angle sensor body 70. The angle sensor body 70 may include a detectable element 70a associated with the outer peripheral surface of the rotational output shaft 74 and may also include a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion. In the example under discussion, the two angle sensors 36 may be different types of angle sensors from each other.

For instance, one of the illustrated angle sensors 36 may be configured such that the angle sensor body 70 includes a magnetic encoder as a detectable element 70a thereof, while the other of the angle sensors 36 may include a resolver. Control of the rotation of the motor unit 6 may be carried out by the aforementioned motor control circuitry 29 (e.g., see FIG. 1 and FIG. 2). To maximize the efficiency of the motor unit 6, the motor controller 33 of the motor control circuitry 29 may control the timings at which respective phase alternating currents are supplied to the coils 78 of the motor stator 73, based on the rotational angle of the motor rotor 75 relative to the motor stator 73 as determined by the angle sensors 36.

Although, in the embodiment under discussion, the angular acceleration monitor 37 and the slip-responsive controller 38 are provided in the inverter unit 22, these components 37, 38 may be provided in the ECU 21 instead.

The second embodiment of the present invention will now be described in connection with FIG. 9 to FIG. 15. In these figures, the same reference signs are used to indicate features that are equivalent to or features that substantially correspond to those of the first embodiment as shown in FIG. 1 to FIG. 8, and those features will not be described any further. Note that the torque command generator 34 provided in the ECU 21 in FIG. 1 corresponds to a drive control subunit 21a including a torque allocator 48 in FIG. 9 which illustrates the second embodiment. Hence, FIG. 9 generally shows the same features as FIG. 1 and only differs from FIG. 1 in that a climbing angle detector 41 is omitted.

Figure 9:
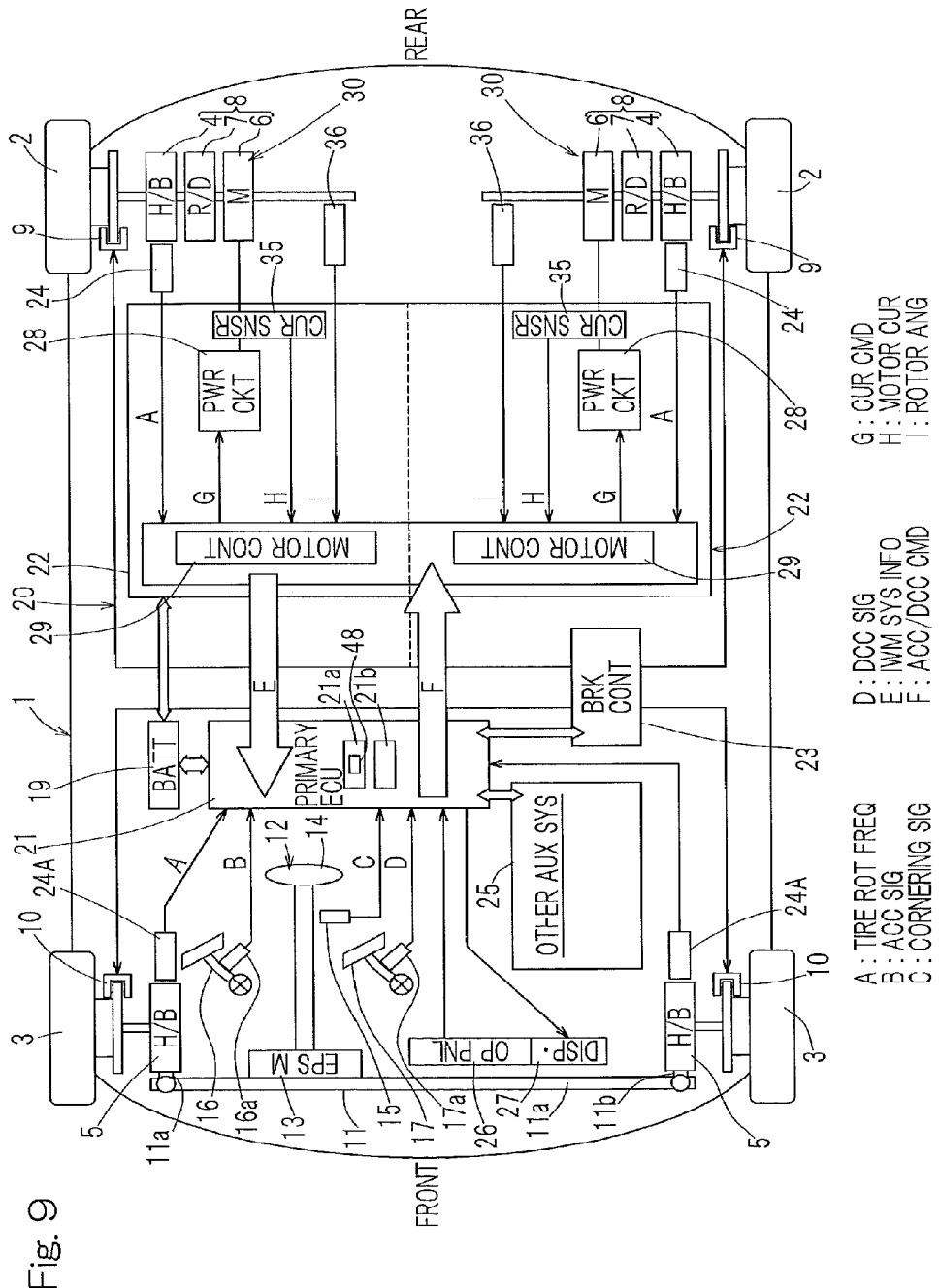
FIG. 9 is a block diagram of a schematic configuration of an electric vehicle, on a plan view, according to the second embodiment of the present invention.
Figure 11:
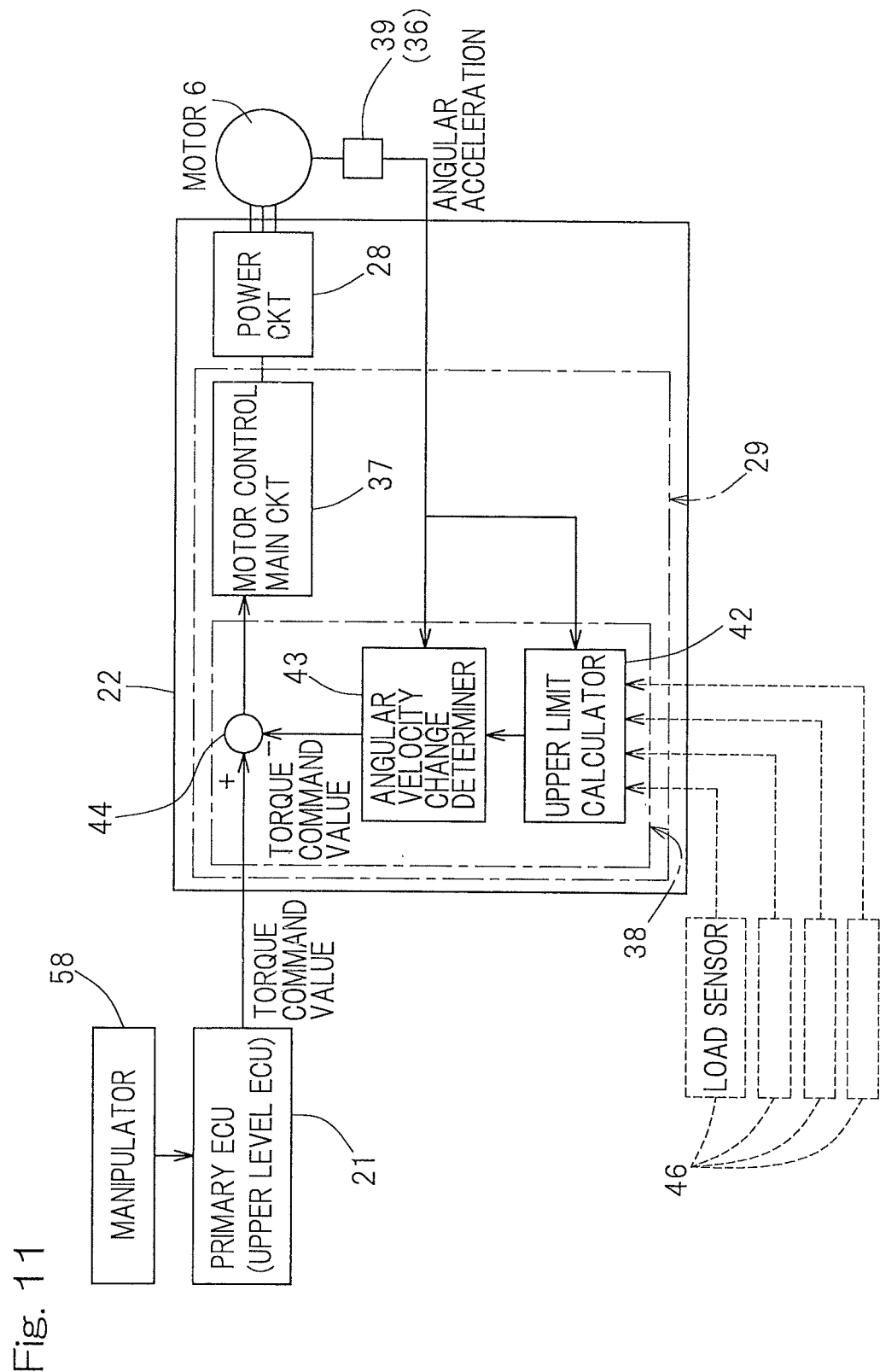
FIG. 11 is a block diagram of a schematic configuration of an inverter unit and a slip-responsive controller for the electric vehicle.

Referring to FIG. 9, the ECU 21 may be generally divided, in terms of its functions, into a drive control subunit 21a that performs drive-related controls and a general control subunit 21b that performs other controls. The drive control subunit 21a may include a torque allocator 48. The torque allocator 48 may be configured to—similarly to the torque command generator 34 in the first embodiment—generate an accelerating/decelerating command in the form of a torque command value, which will influence traction motor units 6, 6 of left and right wheels, based on an accelerating signal produced from an accelerator manipulation unit 16, a decelerating signal produced from a brake manipulation unit 17, and a cornering signal produced from a steering angle sensor 15, and to send the accelerating/decelerating command to the inverter unit 22. The accelerator manipulation unit 16 and the brake manipulation unit 17 may constitute an acceleration and deceleration manipulator 58 (FIG. 11). Referring again to FIG. 9, the torque allocator 48 may be configured to, in response to a decelerating command produced from the brake manipulation unit 17, generate a braking torque command allocated to a regenerative braking operation of the motor units 6 and a braking torque command allocated to a braking operation of mechanical brakes 9, 10. The braking torque command allocated to a regenerative braking operation, if any, will be taken into account when generating an accelerating/decelerating command in the form of a torque command value that will be transmitted to the traction motor units 6, 6 of the left and right wheels. The braking torque command allocated to the operation of the mechanical brakes 9, 10 will be sent to the braking controller unit 23. The torque allocator 48 may also be configured to correct the accelerating/decelerating command, based on information produced from sensors that may be mounted to the vehicle such as information indicating a rotational frequency of a tire produced from the rotation sensor 24 that may be operatively associated with each of the wheel bearing units 4, 5 equipped to the wheels 2, 3.

In the second embodiment—though it is also the case with the first embodiment—the motor control circuitry 29 is provided one for each power circuitry 28. Furthermore, the inverter unit 22 includes one motor control circuitry 29 and one power circuitry 28. And the inverter unit 22, together with the in-wheel motor drive system 8 which includes a motor unit 6 that operates under control by that inverter unit 22, may be considered as forming the aforementioned in-wheel motor unit 30.

Figure 10:
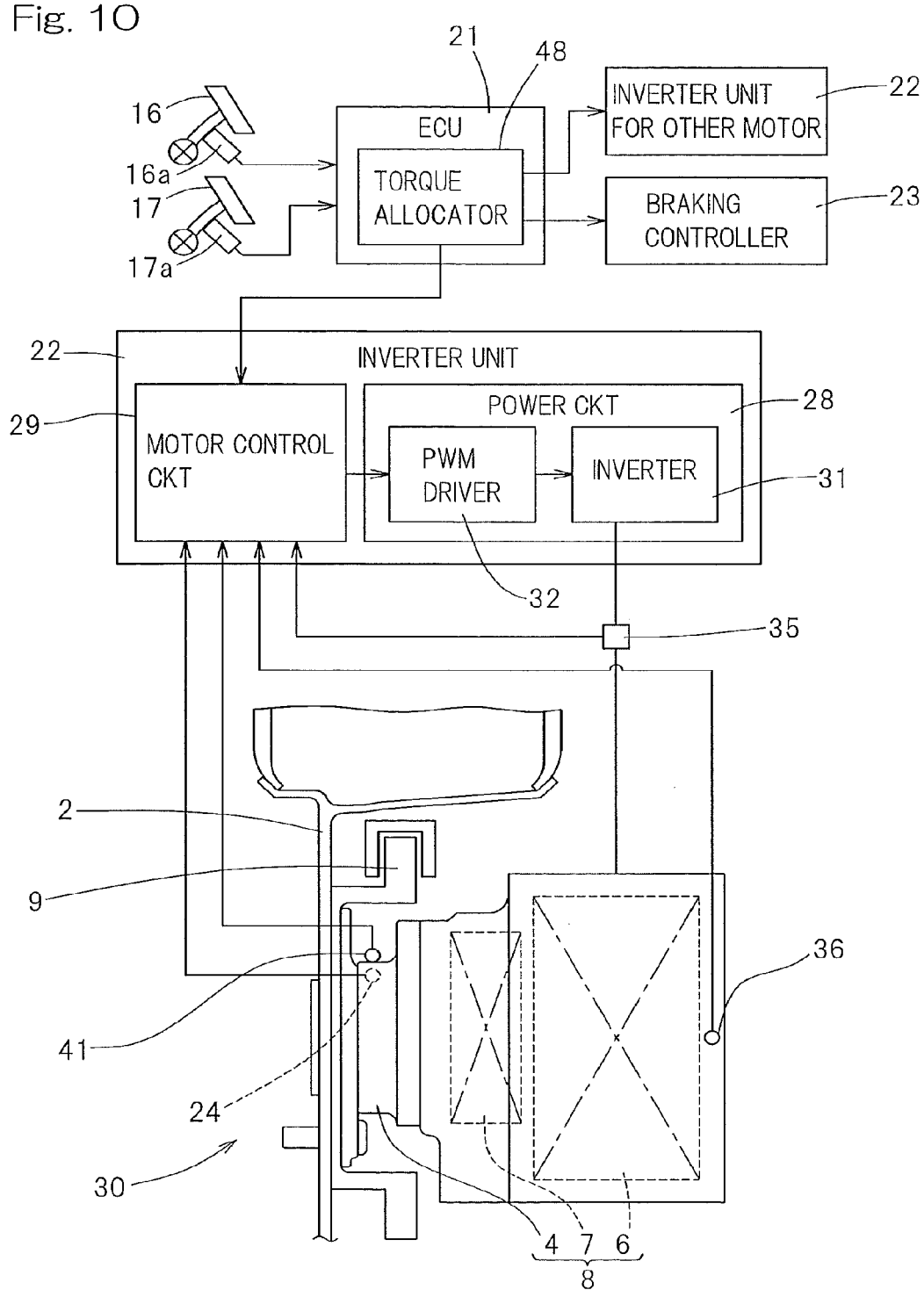
FIG. 10 is a block diagram of a schematic configuration of an in-wheel motor unit for the electric vehicle.

FIG. 10 is a block diagram of a schematic configuration of the in-wheel motor unit 30. As illustrated, the power circuitry 28 of the inverter unit 22 may include an inverter 31 configured to convert a DC power outputted from a battery unit 19 into a three-phase AC power used to drive the motor unit 6 and may include a PWM driver 32 configured to control the inverter 31. The motor unit 6 may include a three-phase synchronous motor such as an IPM (Interior Permanent Magnet) synchronous motor. The inverter 31 may include a plurality of semiconductor switching devices (not shown). The PWM driver 32 may be configured to perform pulse width modulation on a received current command to generate an ON/OFF command for each of the semiconductor switching devices.

The motor control circuitry 29 may include a computer, programs that may be executed by the computer, and various electronic circuits. The motor control circuitry 29 may be configured to receive the accelerating/decelerating command in the form of a torque command from the ECU 21 which serves as an upper-level control unit, convert the accelerating/decelerating command into a current command, and send the current command to the PWM driver 32 of the power circuitry 28. The motor control circuitry 29 may be configured to perform a current feedback control based on the value of a motor current that flows from the inverter 31 to the motor unit 6 as sensed with a current sensor 35. The motor control circuitry 29 may be configured to obtain a rotational angle of a motor rotor in the motor unit 6 as determined by the angle sensor 36 to perform control such as a vector control that relies on a rotational angle.

Referring to FIG. 11, in the second embodiment, the motor control circuitry 29 of the inverter unit 22 may include a motor control main circuit 37 and may also include the slip-responsive controller 38 provided upstream of the motor control main circuit 37. An angular acceleration detector 39 configured to detect an angular acceleration of a wheel may be operatively provided. The motor control main circuit 37 may be configured to generate a current command according to a torque command fed from the aforementioned ECU 21 and send the current command to a power circuitry 28, and may also be configured to perform control such as a vector control that relies on a rotational angle to control the current command. The angular acceleration detector 39 may be configured to calculate, based on conversion of a detected angular acceleration of a motor rotor in the motor unit 6, an angular acceleration of a wheel for output. The angular acceleration detector 39 may, for example, be formed of a resolver and a processor that processes signals detected by the resolver. In a variant, the aforementioned angle sensor 36 may be used as an angular acceleration detector 39 to detect an angular acceleration of a wheel. The slip-responsive controller 38 may be provided in each of respective inverter units 22 for different motor units 6 equipped to corresponding wheels, such that the corresponding wheels are controllable independently of each other.

The slip-responsive controller 38 may include an upper limit calculator 42, an angular velocity change determiner 43, and an adder 44. The upper limit calculator 42 may be configured to calculate an upper limit of angular acceleration detected by the angular acceleration detector 39 as a function of a vehicle mass and an output torque, and to define the calculated upper limit as a threshold. The motor control circuitry 29 of an inverter unit 22 may use the value of the latest motor drive torques which may be obtained based on the value of current as sensed with corresponding ammeter, to derive the value of an output torque.

The angular velocity change determiner 43 may be configured to determine whether or not an angular acceleration detected by the angular acceleration detector 39 is greater than an upper limit calculated by the upper limit calculator 42, and to, when the upper limit is exceeded, output a torque correction value that reduces a torque command value fed from the ECU 21 which serves as an upper-level control unit. The adder 44 may be configured to add a torque correction value outputted from the angular velocity change determiner 43 to a torque command value fed from the ECU 21.

The upper limit calculator 42 of the slip-responsive controller 38 may use a fixed value for the vehicle mass and use a detected value for the output torque to determine and set the upper limit of angular acceleration. In addition or as an alternative, where respective wheel bearing units 4, 5 of two front wheels 3 and two rear wheels 2 (FIG. 9) of the vehicle are associated with respective load sensors 46 (FIG. 11), the upper limit calculator 42 may determine the vehicle mass in real time based on the respective load sensors 46 and to use the determined vehicle mass to determine and set the aforementioned upper limit.

The angular acceleration-based determiner 43 of the slip-responsive controller 38 may vary amount of torque reduction by reducing the outputted torque correction value, according to a degree by which an angular acceleration of the wheel exceeds the aforementioned upper limit. The amount of torque reduction may vary in proportion to—i.e., vary linearly according to—a degree by which the upper limit is exceeded. In a variant, the amount of torque reduction may vary according to a defined curve. In another variant, the amount of torque reduction may vary in a stepwise fashion. In yet another variant, the angular acceleration-based determiner 43 may use a fixed value for the outputted torque correction value.

Figure 12:
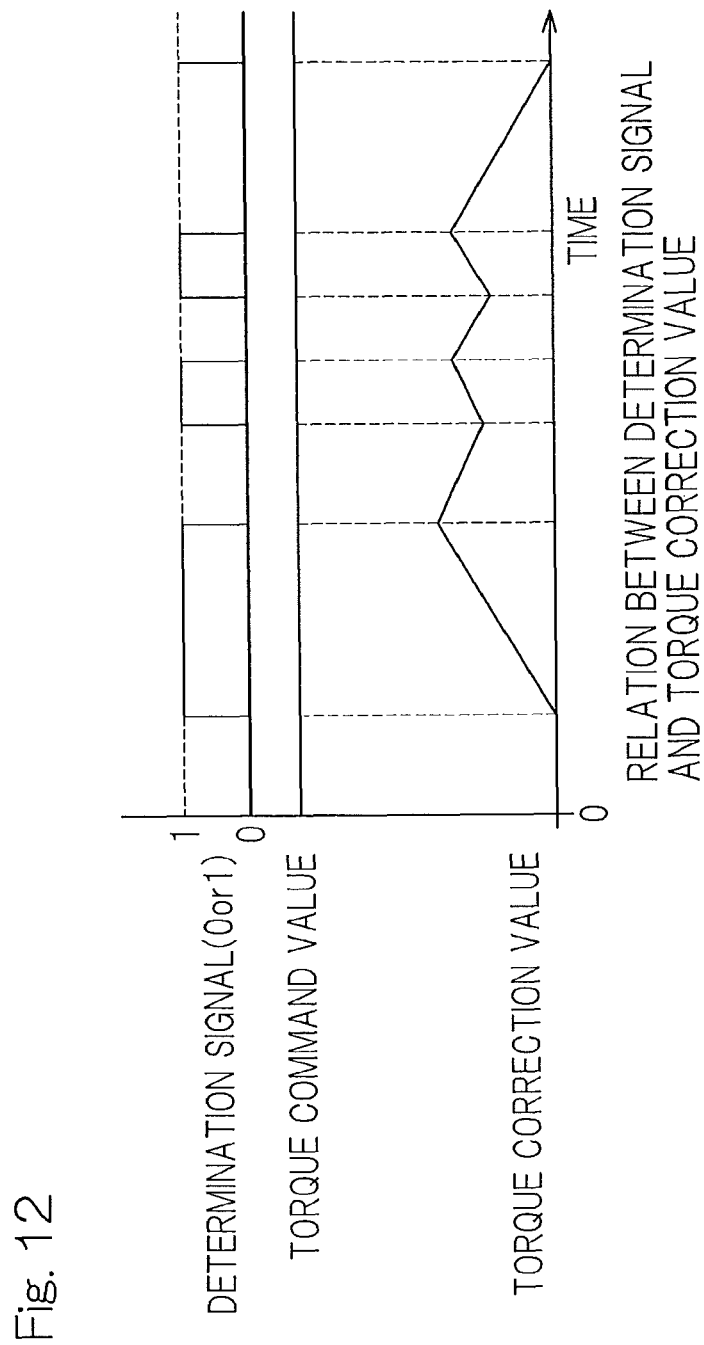
FIG. 12 is a graph that shows an example of control which may be performed by a slip-responsive controller provided in the inverter unit.

How slip-responsive control may be performed according to the aforementioned configuration will be discussed below. The angular acceleration-based determiner 43 may monitor a change in an angular velocity of a given drive wheel, i.e., a change in an angular acceleration as outputted from the angular acceleration detector 39. The angular acceleration-based determiner 43 may, if the change in an angular velocity is greater than a threshold ($\Delta\omega 0$)—which is an upper limit that is calculated based on a vehicle mass and a torque as will be discussed later—determine that there is slip of a tire and output a torque correction value. The adder 44 may add the outputted torque correction value to a torque command value. The angular acceleration-based determiner 43 may output a torque correction value such that a sum of a torque command value and the outputted torque correction value is gradually reduced. FIG. 12 shows an example of how a torque correction value may change.

After determining that there is slip of a tire and outputting a correction value in a manner such as discussed above, the angular acceleration-based determiner 43 may, if it determines that the change in an angular velocity becomes equal to or smaller than the threshold ($\Delta\omega 0$) (i.e., an upper limit)—that is, if it determines that that there is no longer slip of a tire—may begin to decrease a torque correction value that is added to a torque command value to bring a sum of a torque command value and the outputted torque correction value closer to the torque command value—that is, to cause the resulting torque correction value to gradually reduce down to zero.

Next, it will be shown why it is reasonable to define a threshold ($\Delta\omega 0$) for use in slip determination as a function of a vehicle mass and an output torque, by making reference to several relations and equations.

Note that, in the equations that follow, W (kg) is a fully loaded vehicle mass, T (Nm) is an axle torque, $T_0$ (Nm) is a moor torque, r (m) is a tire rolling radius, $\omega$ (rad/s) is an angular velcity of a tire, $\omega_0$ (rad/s) is an angular velocity of a motor, F (N) is a propulsion force at a tire/road contact point, a (m/s$^2$) is an acceleration of a vehicle, V (m/s) is a velocity of a vehicle, g (m/s$^2$) is a gravitational acceleration, and R is a reduction ratio.

According to the laws of motion with respect to a vehicle, the following relations stand:

$$F = T/r = R \times T_0/r = W \times g \times a \quad (11)$$

$$V = r \times \omega = a \times t \quad (12)$$

$$\omega = \omega_0/R \quad (13)$$

From the equations (12) and (13), the following equation (14) can be derived:

$$a = r \times \omega_0/(R \times t) \quad (14)$$

From the equations (11) and (14), the following equation (15) can be derived:

$$\omega_0 = R^2 \times T_0 \times W \times g \times t/r^2 \quad (15)$$

From the equation (15), an angular acceleration of a motor can be derived as follows:

$$\omega_0' = R^2 \times T_0 \times W \times g/r^2 \, [\text{rad/s}^2] \quad (16)$$

From the equation (16), it can be shown that an actual angular acceleration of a motor $\Delta\omega_0$ should meet the following condition:

$$\Delta\omega_0 < R^2 \times T_0 \times W \times g/r^2 \quad (17)$$

where $\Delta\omega_0$ is a maximum change in an angular velocity as calculated based on a vehicle mass and a torque.

Assuming that a resolver is used to detect a motor's rotational angle, the number of divisions of a resolver per revolution of the motor can be expressed as (the resolution of the resolver)×(the number of pole pairs). Then, a change in the rotational angular velocity as expressed with bits will be as follows:

$$\Delta\omega r = \text{(the resolution of the resolver)} \times R^2 \times T_0 \times W \times g/r^2$$

Then, $\Delta\omega r \propto K \times T_0 \times W$ \hfill (18)

where K is ((the resolution of the resolver)×$R^2$×g/$r^2$).

From the relation (18), the following relation stands: $\Delta\omega r \propto K \times T_0$.

A torque output per wheel can be expressed as follows: $T_0 = 2 \times T_1$ where $T_1$ is a torque per wheel.

Therefore, the following relation stands: $\omega_r \propto K \times T_1$.

Hence, the angular velocity change determiner 43 may determine that there is slip, if, for a given motor torque T1, a detected change in the rotational angular velocity as expressed with bits is equal to or greater than K×$T_1$ and may, if so, output a torque correction value that causes the motor torque to be reduced. Further, it can be shown from the aforementioned equations and relations that an upper limit of the change in an angular velocity is also a function of a vehicle mass. Thus, an axle load of a vehicle may be measured at respective four wheels thereof in real time to calculate a sum of the respective measurements as the value of m in the above equations. This may enable performing optimized control.

In this way, an electric vehicle control device according to the aforementioned configuration may enable appropriate slip prevention, thereby maximizing grip of tire(s).

The motor unit 6 may be associated with an angle sensor 36 that may sense a rotational angle of the motor rotor 75 relative to the motor stator 73. The angle sensor 36 may include an angle sensor body 70 that senses signals representing a rotational angle of the motor rotor 75 relative to the motor stator 73 for output and may also include an angle calculation circuit 71 that calculates a rotational angle based on the signals produced from the angle sensor body 70. The angle sensor body 70 may include a detectable element 70a associated with the outer peripheral surface of the rotational output shaft 74 and may also include a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion. In the illustrated example, the angle sensor 36 may include a magnetic encoder or a resolver. Control of the rotation of the motor unit 6 may be carried out by the aforementioned motor control circuitry 29 (e.g., see FIG. 9 and FIG. 10). To maximize the efficiency of the motor unit 6, the motor controller 33 of the motor control circuitry 29 may control the timings at which respective phase alternating currents are supplied to the coils 78 of the motor stator 73, based on the rotational angle of the motor rotor 75 relative to the motor stator 73 as determined by the angle sensor 36. A connector 99 may be formed at the motor housing 72 for connection of the wires for a motor current in the in-wheel motor drive system 8, wires for various sensors, wires for various commands, and etc.

Figure 13:
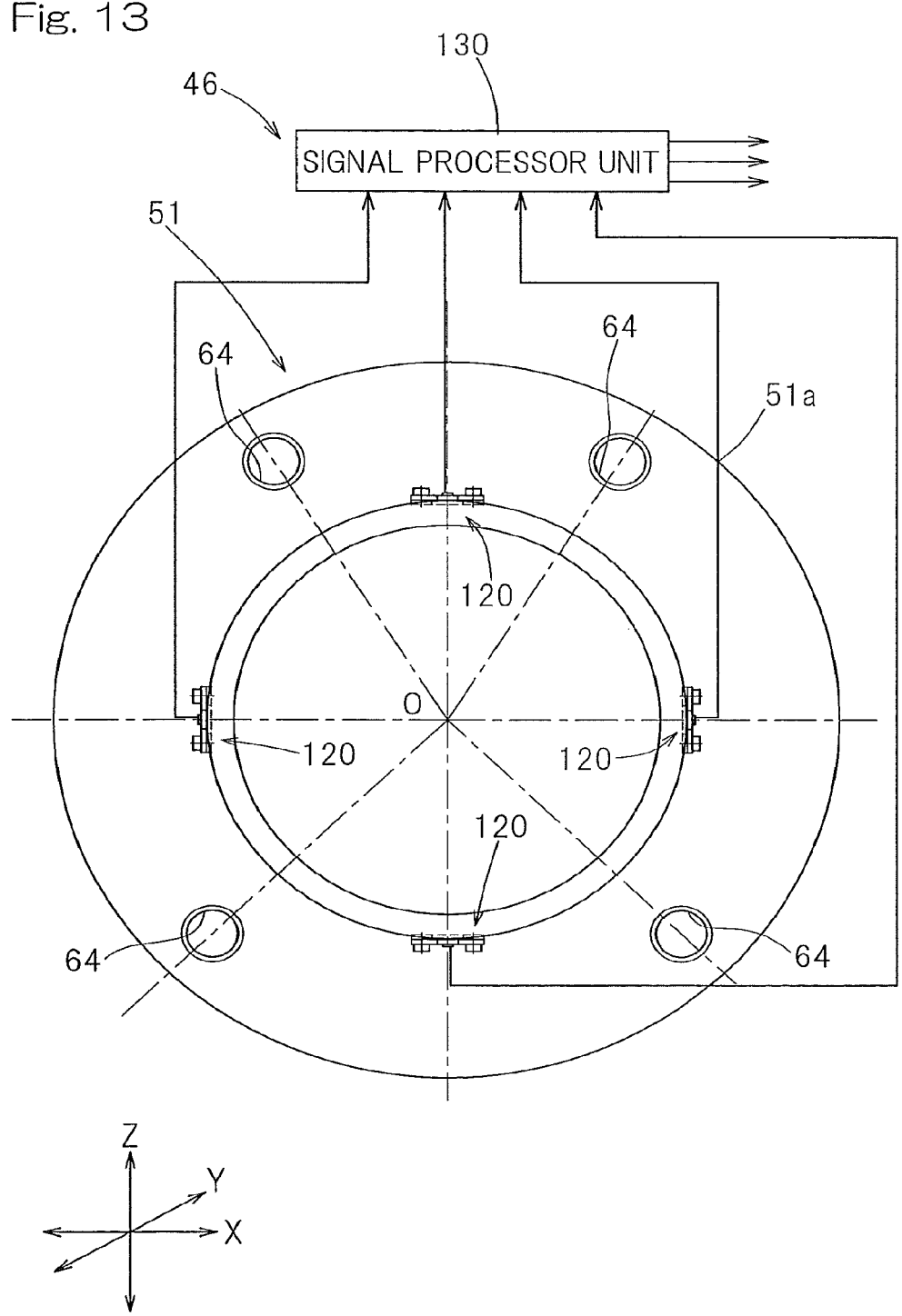
FIG. 13 shows a side view of an outer member of a wheel bearing unit for the electric vehicle, as illustrated in combination with a signal processor unit for load determination.

The load sensor 46 as shown in FIG. 11 may include a plurality of sensor units 120 such as shown in FIG. 13 and may also include a signal processor unit 130 that processes output signals of the sensor units 120. As illustrated, a sensor unit 120 may be provided at four locations of an outer diameter surface of the outer member 51 which may serve as a stationary member of the wheel bearing unit 4. FIG. 13 illustrates a front view of the outer member 51 as viewed from an outboard side. As illustrated, the sensor units 120 may be positioned at upper, lower, right and left parts, respectively, of the outer diameter surface of the outer member 51, with the upper and lower parts corresponding to vertical regions relative to a tire in contact with a road surface and the right and left parts corresponding to horizontal regions relative to a tire in contact with a road surface. The signal processor unit 130 may be disposed on or at the outer member 51, or may be included in a motor control circuitry 29 of an inverter unit 22.

The signal processor unit 130 may compare the outputs of the sensor units 120 provided at four locations and determine, according to a defined calculation formula, the respective loads applied to a wheel bearing unit 4—in particular, a vertical load Fz that acts between a road surface and a tire equipped to a wheel 2, a load Fx that acts along a direction in which the vehicle travels and that may be defined by a drive force or a brake force, and/or an axial load Fy, for output. The four sensor units 120 may be evenly disposed on upper, lower, right and left parts, respectively, of an outer diameter surface of the outer member 51 such that the four sensor units 120 are positioned to be circumferentially 90° out of phase from each other, with the upper and lower parts corresponding to vertical regions relative to a tire in contact with a road surface and the right and left parts corresponding to horizontal regions relative to a tire in contact with a road surface. This may allow for more accurate estimation of a vertical load Fz, a load Fx that acts along a direction in which the vehicle travels, and/or an axial load Fy—which may be applied to the wheel bearing unit 4. The vertical load Fz may be determined based on comparison between the outputs of the upper and lower sensor units 120. The load Fx that acts along a direction in which the vehicle travels may be determined based on comparison between the outputs of the rear and front sensor units 120. The axial load Fy may be determined based on comparison between the outputs of the four sensor units 120. The calculation formula(s) and/or parameter(s) that may be used in determination of the loads Fx, Fy, Fz may be defined based on experiment and/or simulation results, to achieve more precise determination of the load(s) by the signal processor unit 130. Note that the aforementioned determination may include various correction procedures, which will not be discussed herein for the purpose of simplicity.

Figure 14:
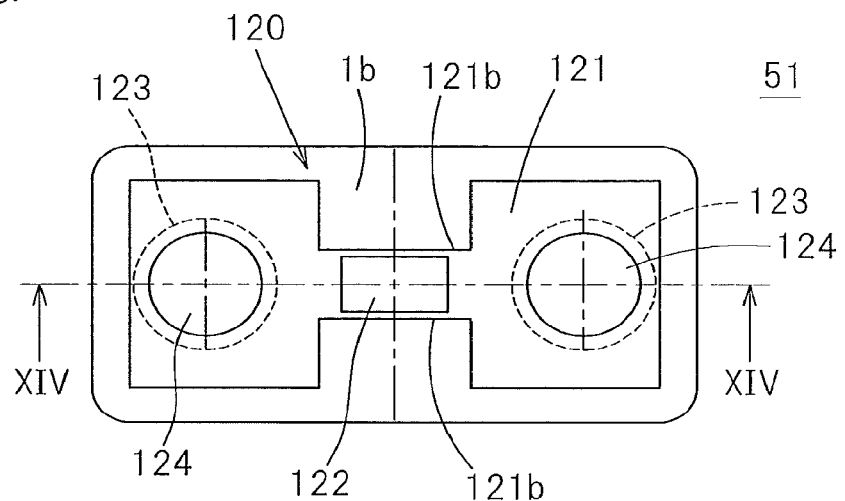
FIG. 14 is an enlarged plan view of a sensor unit for the electric vehicle.
Figure 15:
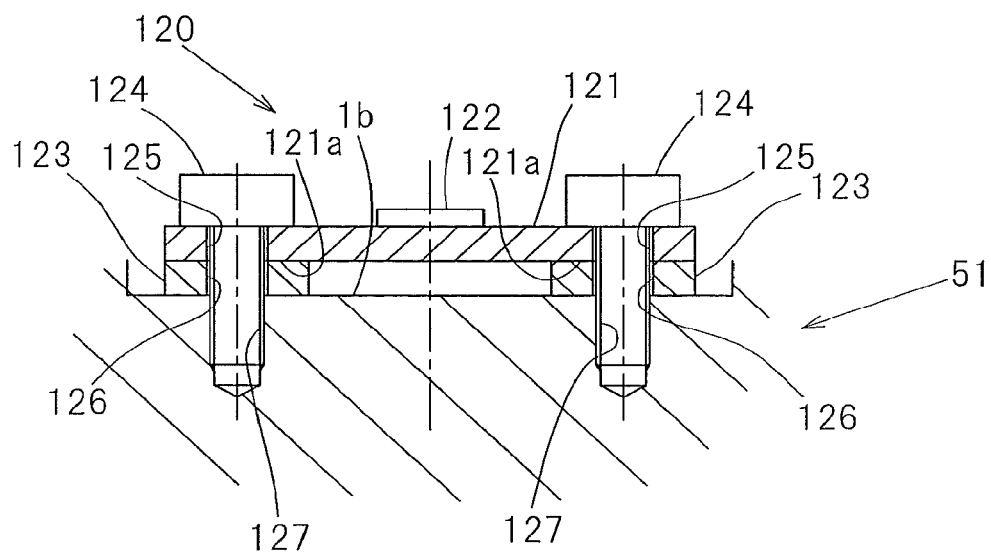
FIG. 15 is a cross sectional view of the sensor unit.

As shown in an enlarged plan view of FIG. 14 and an enlarged longitudinal cross sectional view of FIG. 15, the sensor unit 120 may include a strain generator member 121 and a strain sensor 122 mounted on the strain generator member 121 to sense strain in the strain generator member 121. The strain generator member 121 may comprise a elastically deformable, metal plate, such as a steel plate, that may have a thickness of 3 mm or less. The metal plate may have a shape of a strip with a generally uniform width along its length as viewed on a plan view. The metal plate may have cutouts 121b formed at a center thereof on opposite sides. The strain generator member 121 may include, at opposite ends, two fixation contact segments 121a that are fixedly in contact through respective spacers 123 with an outer diameter surface of the outer member 51. The strain sensor 122 may be affixed on the strain generator member 121 at a location where a larger strain occurs in response to application of load of various directions. As illustrated, the strain sensor 122 may be placed on an outer face of the strain generator member 121 so as to be positioned at a center of the strain generator member 121 where the strain sensor 122 is positioned between the cutouts 121b formed on opposite sides of the strain generator member 121. In this way, the strain sensor 122 can sense strain in the strain generator member 121 that occurs in the vicinity of the cutouts 121b along a circumferential direction of the strain generator member 121.

The sensor unit 120 may be such that two fixation contact segments 121a of a strain generator member 121 are arranged at respective positions with respect to axial direction of the outer member 51 and spaced from each other along a circumferential direction of an outer diameter surface of the outer member 51. The fixation contact segments 121a may be fixedly associated through respective spacers 123, with corresponding bolts 124, to an outer diameter surface of the outer member 51. The bolts 124 may be inserted into bolt insertion radial through holes 125 formed in the respective fixation contact segments 121a, may be passed through bolt insertion holes 126 formed in the spacers 123, and may be screwed into threaded holes 127 formed in an outer periphery of the outer member 51. With such a configuration of fixedly associating the fixation contact segments 121a through respective spacers 123 to an outer diameter surface of the outer member 51, a center of the thin-plate, strain generator member 121 where the cutouts 121b are formed can be physically separated from an outer diameter surface of the outer member 51, thus facilitating strain-induced deformation of the strain generator member 121 in the vicinity of the cutouts 121b. As illustrated, the fixation contact segments 121a may be positioned on respective axial locations which are in the vicinity of an outboard row of raceway surfaces 53 of the outer member 51. The vicinity of an outboard row of raceway surfaces 53 of the outer member 51 used herein refers to a region starting from the center between an inboard row of raceways surfaces 53 and an outboard row of raceway surfaces 53 and extending to the area where the outboard row of raceway surfaces 53 is formed, so as to accommodate that area. An outer diameter surface of the outer member 51 may include a flat segment 1b with which the spacers 123 are fixedly in contact.

Various types of a strain sensor 122 may be used. For example, a stain sensor 122 may include a metal foil strain gauge. In such a case, the strain sensor 122 is typically glued and fixed to the strain generator member 121. In a variant, a strain sensor 122 may include a thick film resistor formed on the strain generator member 121.

As shown in FIG. 9 and FIG. 10, in the second embodiment, the motor control circuitry 29 may be included in the inverter unit 22. In a variant, however, the motor control circuitry 29 may be included in a primary ECU 21. Further, although the ECU 21 and the inverter unit 22 has been described as being independent or separate from each other in the preceding discussion of the second embodiment, the ECU 21 and the inverter unit 22 may form a single, integrated control unit. Furthermore, although the preceding embodiments have been described as being applied to an electric vehicle that includes in-wheel motor drive systems 8, the present invention can also be applied to an electric vehicle that includes on-board type motor units to drive left and right wheels independently of each other, or to an electric vehicle that includes a single motor unit to drive both left and right wheels.

Note that each of the preceding embodiments also encompasses the following Implementations 1 to 7 which do not necessarily require the use of the formula(s) (1) to (6):

[Implementation 1]

Implementation 1 may provide an electric vehicle control device that includes a motor controller configured to control driving of a traction motor unit, according to a torque command value fed from and generated by an upper-level control unit based on signals outputted from an acceleration and deceleration manipulator. The electric vehicle control device also includes or is associated with a rotation detector device configured to detect an angular acceleration of a wheel driven by the motor unit. The motor controller includes a slip-responsive controller configured to define an upper limit of angular acceleration detected by the rotation detector device as a function of a vehicle mass and an output torque and to, if an angular acceleration detected by the rotation detector device is greater than the defined upper limit, cause the torque command value to be reduced.

[Implementation 2]

In the Implementation 1, the slip-responsive controller may be configured to use a fixed value for the vehicle mass to determine and set the upper limit of angular acceleration, whereby the set upper limit varies with an output torque.

[Implementation 3]

In the Implementation 1, respective wheel bearing units of two front and two rear wheels of the vehicle may be associated with respective load sensors, and in which the slip-responsive controller may be configured to determine the vehicle mass in real time based on the respective load sensors and to use the determined vehicle mass to determine and set the aforementioned upper limit.

[Implementation 4]

In any one of the Implementations 1 to 3, the slip-responsive controller may be configured to vary amount of torque reduction, according to a degree by which an angular acceleration of a wheel exceeds the aforementioned upper limit.

[Implementation 5]

Implementation 5 may provide an electrically motorized wheel that includes wheels, motor units configured to drive two or more wheels independently of each other, and the motor controller as defined by any one of the Implementations 1 to 4, such that corresponding wheels are controllable independently of each other by the slip-responsive controller.

[Implementation 6]

Implementation 6 may provide an electric vehicle including an electric vehicle control device as defined in any one of the Implementations 1 to 5.

[Implementation 7]

Implementation 7 may provide a method of slip-responsive control for an electric vehicle. The method includes controlling driving of a traction motor unit, according to a torque command value fed from and generated by an upper-level control unit based on signals outputted from an acceleration and deceleration manipulator. The method also includes detecting an angular acceleration of a wheel driven by the motor unit. The method also includes defining an upper limit of the detected angular acceleration as a function of a vehicle mass and an output torque and causing, if the detected angular acceleration of the wheel is greater than the defined upper limit, the torque command value to be reduced.

Although the present invention has been described in connection with preferred embodiments and particular implementations with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Vehicle body
2, 3: Wheel
4, 5: Wheel bearing unit
6: Motor unit
7: Reducer unit
8: In-wheel motor drive system
9, 10: Electrically-driven brake
11: Turning mechanism
12: Steering mechanism
20: Electric vehicle control device
21: ECU
22: Inverter unit
24: Rotation sensor
28: Power circuitry
29: Motor control circuitry
31: Inverter
32: PWM driver
33: Motor controller
34: Torque command generator
37: Angular acceleration monitor
38: Slip-responsive controller
39: Angular acceleration detector
41: Climbing angle detector
46: Load sensor

What is claimed is:

1. An electric vehicle control device comprising:
a motor controller configured to control, according to a torque command fed from a torque command generator, a torque of a motor unit that is configured to drive a wheel;
an angular acceleration detector configured to detect an angular acceleration of a wheel driven by the motor unit;
an angular acceleration monitor configured to monitor whether or not an angular acceleration of a wheel detected by the angular acceleration detector is equal to or smaller than an acceptable angular acceleration W that is calculated with one of following formulas (1) to (6):

$$W = k1 \times R \times Tt/m/r^2 \tag{1}$$

where k1 is a constant that takes an arbitrary value in the range of 1 to 2;

$$W = k2 \times R \times Tt/m/r^2 + mg \times \sin(a)/m/r \tag{2}$$

where k2 is a constant that takes an arbitrary value in the range of 1 to 2 and g is a gravitational acceleration;

$$W = k3 \times R \times Tt/m/r^2 + mg \times \sin(a1)/m/r \tag{3}$$

where k3 is a constant that takes an arbitrary value in the range of 1 to 2;

$$W = k4 \times R \times Tmaxt/m/r^2 \tag{4}$$

where Tmaxt is a total maximum torque that is a sum of maximum torques of all motor units that drive wheels of the vehicle and k4 is a constant that takes an arbitrary value in the range of 1 to 2;

$$W = k5 \times R \times Tmaxt/m/r^2 + mg \times \sin(a)/m/r \tag{5}$$

where Tmaxt is a total maximum torque that is a sum of maximum torques of all motor units that drive wheels of the vehicle, k5 is a constant that takes an arbitrary value in the range of 1 to 2, and g is a gravitational acceleration; and $$W = k6 \times R \times Tmaxt/m/r^2 + mg \times \sin(a1)/m/r \tag{6}$$

where Tmaxt is a total maximum torque that is a sum of maximum torques of all motor units that drive wheels of the vehicle and k6 is a constant that takes an arbitrary value in the range of 1 to 2;
where Tt is a total drive torque that is a sum of drive torques of all motor units that drive wheels of the vehicle, m is a vehicle mass, r is a tire radius, R is a reduction ratio of a reducer unit interposed between the motor unit and the wheel, a is a vehicle climbing angle detected by a climbing angle detector, and a1 is a maximum vehicle climbing angle as specified by specifications of the vehicle; and
a slip-responsive controller configured to, when the angular acceleration monitor determines that the detected angular acceleration is greater than the acceptable angular acceleration W, cause the motor controller to reduce a drive torque of the motor unit.

2. The electric vehicle control device as claimed in claim 1, wherein the motor unit is configured to drive a wheel of the electric vehicle independently of other wheels.

3. The electric vehicle control device as claimed in claim 2, wherein the slip-responsive controller is configured to cause the motor controller to reduce a drive torque of only a motor unit that drives a wheel rotating at an angular acceleration detected by the angular acceleration detector that is greater than the acceptable angular acceleration W.

4. The electric vehicle control device as claimed in claim 2, wherein the motor unit, together with a reducer unit, forms an in-wheel motor drive system that is partly or entirely disposed within a wheel, and wherein the in-wheel motor drive system includes the motor unit and the reducer unit.

5. The electric vehicle control device as claimed in claim 1, wherein the electric vehicle comprises a reducer unit configured to reduce speed of rotation of the motor unit, the reducer unit including a cycloidal reducer with a high reduction ratio of 4 or greater.

6. The electric vehicle control device as claimed in claim 1, wherein the slip-responsive controller is configured to determine and set the acceptable angular acceleration W based solely on an output torque, where the vehicle mass is a fixed value.

7. The electric vehicle control device as claimed in claim 1, wherein respective wheel bearing units of two front and two rear wheels of the vehicle are associated with respective load sensors, and wherein the slip-responsive controller is configured to use a vehicle mass measured in real time by the load sensors to determine and set the acceptable angular acceleration W.

8. The electric vehicle control device as claimed in claim 1, wherein the slip-responsive controller is configured to vary amount of torque reduction, according to a degree by which an angular acceleration of a wheel exceeds the acceptable angular acceleration W.

9. The electric vehicle control device as claimed in claim 1, wherein motor units with which two or more wheels are independently driven and inverter units to respectively control the corresponding motor units are provided such that corresponding wheels are controllable independently of each other by the slip-responsive controller.

10. An electric vehicle comprising the electric vehicle control device as claimed in claim 1.

* * * * *